US012758980B2

(12) United States Patent
Premendra

(10) Patent No.: US 12,758,980 B2
(45) Date of Patent: Oct. 13, 2026

(54) SYSTEM AND PROCESS FOR MONITORING WEAR ON COMPONENTS OF A GRINDING MILL

(71) Applicant: Bühler AG, Uzwil (CH)

(72) Inventor: Prasanna Premendra, Winterthur (CH)

(73) Assignee: Bühler AG, Uzwil (CH)

( * ) Notice: Subject to any disclaimer, the term of this patent is extended or adjusted under 35 U.S.C. 154(b) by 385 days.

(21) Appl. No.: 18/282,236

(22) PCT Filed: Mar. 21, 2022

(86) PCT No.: PCT/EP2022/057345
§ 371 (c)(1),
(2) Date: Sep. 15, 2023

(87) PCT Pub. No.: WO2022/195127
PCT Pub. Date: Sep. 22, 2022

(65) Prior Publication Data

US 2024/0157373 A1 May 16, 2024

(30) Foreign Application Priority Data

Mar. 19, 2021 (CH) .................................... 297/2021

(51) Int. Cl.
*B02C 25/00* (2006.01)
*B02C 4/06* (2006.01)

(52) U.S. Cl.
CPC ................ *B02C 25/00* (2013.01); *B02C 4/06* (2013.01); *B02C 2210/01* (2013.01)

(58) Field of Classification Search
None
See application file for complete search history.

(56) References Cited

FOREIGN PATENT DOCUMENTS

WO 2018/036978 A1 3/2018

OTHER PUBLICATIONS

International Search Report and Written Opinion mailed on Jul. 27, 2022, received for PCT Application PCT/EP2022/057345, filed on Mar. 21, 2022, 12 pages including English Translation.

*Primary Examiner* — Sean Shechtman
(74) *Attorney, Agent, or Firm* — XSENSUS LLP

(57) ABSTRACT

A process and system for monitoring of wear on components of a grinding mill to determine an optimized future time for maintenance of the grinding mill. The system uses control circuitry for controlling the grinding mill, a sensory system for detecting measurement data on technical parameters relating to a wear condition of a component and an operating state of the grinding mill, analysis circuitry to analyze a wear behavior of the grinding mill, and a data transmitter and data receiver to exchange data. The sensory system detects measurement data on the wear condition of at least one component and the operating state of the grinding mill. The analysis circuitry derives from several pieces of measurement data detected at different times a future wear state at a time in the future and assigns the future wear state to a future degree of wear and a future maintenance loss.

25 Claims, 20 Drawing Sheets

| | | | |
|---|---|---|---|
| Customer: | Schulmühle | Roll: | Front |
| Mill Identifier: | A-Mühle | Measurement Position: | Middle |
| Operator: | Degasped | | |
| Measurement Type: | Smooth | | |
| Passage: | C4 #1 / 4th Gr. #1 | | |

Notes:

Subjective Condition Rating:

| | |
|---|---|
| Surface Condition: | Not blank |
| Roll Condition: | No impact |
| Roll Stump: | Good |

Front Roll Middle

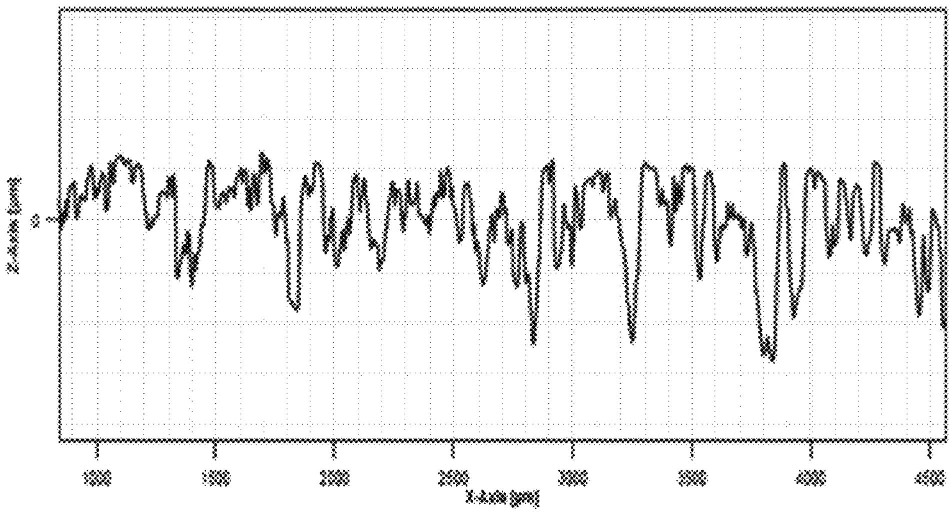

| Parameters | Value | Unit | |
|---|---|---|---|
| Roughness: | 2.25 | µm | |
| Roughness Status: | WATCH | Status Legend: | OK: 2.5 - 3 µm |
| | | | WATCH: 2 - 2.5 µm |
| | | | CRITICAL: 0 - 2 µm |

Fig. 7

| | | | |
|---|---|---|---|
| Customer: | Test | Serial #: | 234567890 |
| Operator: | Jörn Degaspen | Analysis Method: | Bühler Corrugation |
| Passage: | Workshop | Method Version: | 1.00 |
| Notes: | | Measurements: | |
| | | After Renewing: | 06.01.2017 08:23 |

Single Profile Roll Middle

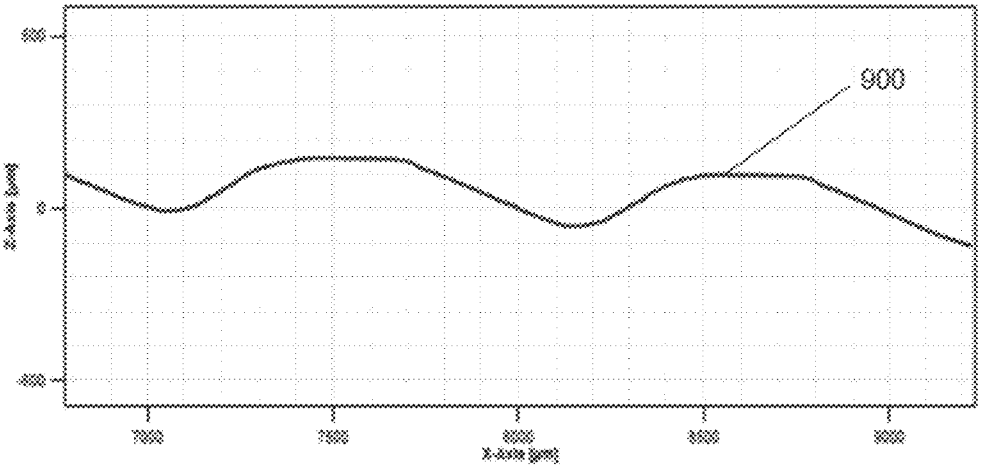

| Production Target Values | Target Value | Actual Value | |
|---|---|---|---|
| | Value Unit | Value Unit | Tolerance Unit |
| Form Type: | 54 | | |
| Sharp Angle: | 35 ° | 55 ° | 3 ° |
| Dull Angle: | 75 ° | 66 ° | 3 ° |
| Land Length: | 200 µm | 349 µm | 60 µm + |
| | | | 60 µm - |

| | |
|---|---|
| Spiral: | 8 % |
| Number of Flutes: | 800 # |
| Roll Diameter: | 250.0 mm |

| Subjective Condition Rating | |
|---|---|
| Edge Condition: | Sharp |
| Roll Condition: | No impact |
| Roll Stump: | Good |

Fig. 9a

| | | | |
|---|---|---|---|
| Customer: | Florin | Roll: | Front |
| Mill Identifier: | MillA | Measurement Position: | Middle |
| Operator: | Florin Bühler | Analysis Method: | Bühler Corrugation |
| Passage: | B1 #1 / 1st Br. #1 | Method Version: | 1.00 |
| Notes: | | Subjective Condition Rating: | |
| | | Edge Condition: | Heavily rounded |
| | | Roll Condition: | Impacted |
| | | Roll Stump: | Good |

Front Roll Middle

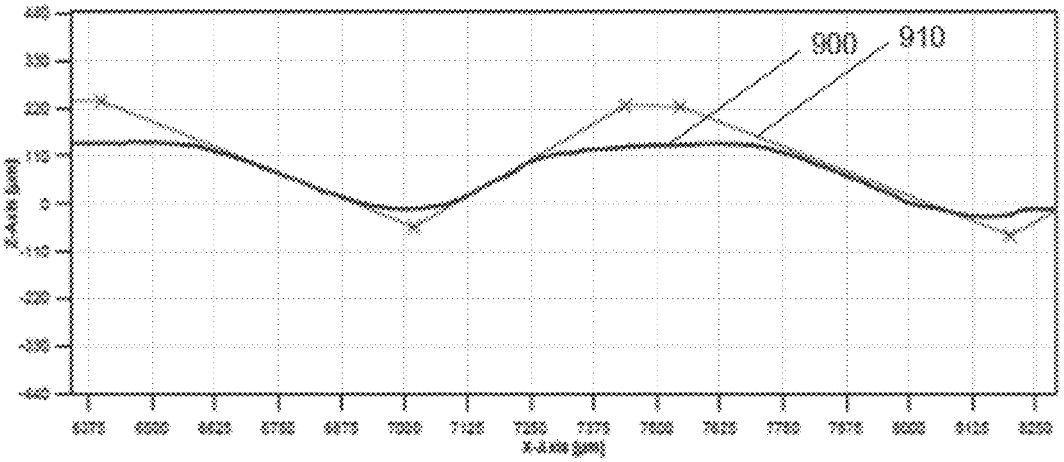

| Parameters | Value | Unit | Parameters | Value | Unit |
|---|---|---|---|---|---|
| Actual Corrugation Area: | 0.11 mm² | | | | |
| Base Corrugation Area: | 0.14 mm² | | | | |
| Corrugation Area Ratio: | 79% | | | | |
| Corrugation Area Reduction: | 21% | | | | |
| | | | | | |
| Actual Corrugation Height: | 159 µm | | Profile Orientation: | Land-Dull-Sharp-Land | |
| Base Corrugation Height: | 243 µm | | Corrugation Type: | 74 | |
| Corrugation Height Ratio: | 65% | | | | |
| Corrugation Height Reduction: | 35% | | | | |

| | | | | | |
|---|---|---|---|---|---|
| Actual Gap Area: | 0.06 mm² | | Area Reduction: | 21% | |
| Base Gap Area: | 0.14 mm² | | Wearout Status: | CRITICAL | |
| Gap Area Ratio: | 45% | | Status Legend: | OK: < 5% | |
| Gap Area Reduction: | 55% | | | Watch: ≥ 5% and ≤ 12% | |
| | | | | Critical: > 12% | |

Fig. 9b

| | | | |
|---|---|---|---|
| Company Name | Schulmühle | Address | |
| Mill Identifier | Uzwil | Country | |
| | | Operator | Degasperi |

Outcome

| | |
|---|---|
| ecoReport Date | 14.01.2016 |
| Service costs [$] | 10'000 |
| Lost Energy [$] | 3'419 |
| Lost Yield [$] | 35'372 |
| Total Saving Potential [$] | 28'791 |

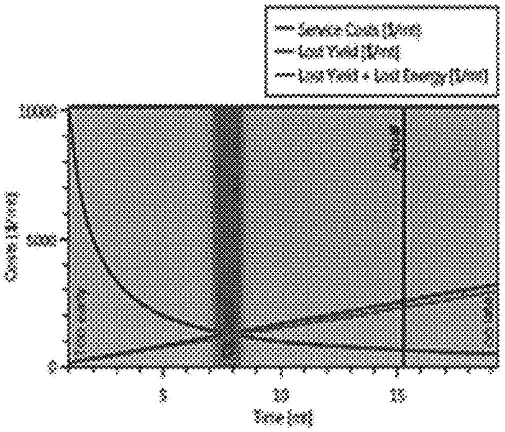

Measurements

| | Operation Lifetime [mt] | Avg. Passage Wear [%] | Passages Changed [#] | Lost Energy [$] | Lost Yield [$] |
|---|---|---|---|---|---|
| B1 | 15.25 | 12.0 | 1 | 3'419 | 35'372 |
| B2 | 0.00 | | 0 | 0 | 0 |
| | | | | | |
| | | | | | |
| | | | | | |
| Sum / Avg | 15.25 | 12.0 | 1 | 3'419 | 35'372 |

Parameters (Real)

Service costs [$] 10'000

| Yield | Before [%] | After [%] |
|---|---|---|
| 1. Quality | 55.0 | 55.3 |
| 2. Quality | 20.0 | 19.8 |
| Bran | 25.0 | 24.9 |

Recommendation for Corrugation Change

| | Wear [%] | Time [mt] |
|---|---|---|
| B1 | 9 | 11 |
| B2 | 7 | |

Fig. 9c

SYSTEM AND PROCESS FOR MONITORING WEAR ON COMPONENTS OF A GRINDING MILL

CROSS-REFERENCE TO RELATED APPLICATIONS

The present application is based on PCT filing PCT/EP2022/057345, filed Mar. 21, 2022, which claims priority to Swiss Patent Application No. 00297/2021, filed on Mar. 19, 2021, the entire contents of each are incorporated herein by its reference.

TECHNICAL FIELD

The invention relates to a system and process for monitoring wear, particularly a system and process for technical maintenance based on dynamic monitoring of components of a grinding or rolling mill or other crushing device. In particular, the invention relates to a system and process for monitoring wear of a surface for grinding rolls, particularly roll profiles in fine grinding mils. Furthermore, the invention relates to a grinding mil with such a system.

Grinding mills such as mils or grinders frequently use cylindrical rolls or roll pairs for infeeding and crushing of a grinding or crushing material. Due to the required crushing effect of grinding rolls, these are generally provided with a hard surface or are cast and surface-hardened up to a depth of 10 mm, for example. Below the hard surface, the material of the rolls is relatively softer or tends towards more rapid wear, which can lead to possible damage of the entire roll and therefore failure of the grinding function. Therefore, it is advantageous to monitor the wear of the components of a grinding mil, particularly the surfaces of the rolls, periodically or continuously, as this enables the timely implementation of maintenance work and forecasting of the anticipated remaining service life of the components and therefore reliable maintenance of the grinding mils.

BACKGROUND OF THE INVENTION

Conventional grinding mils exhibit a roll stand as a crushing machine, in which the grinding material is broken down and communited between rotating rolls. This construction of a grinding mill is currently the most widespread in industrial cereal mils. Grinding in a modern mill comprises two processes which are typically repeated multiple times: crushing and screening. The roll stand performs the grinding. In this case, the endosperm is removed from the bran in several processes. The mixture obtained as a result is directed onto a plane sitter for separation. The large particles which have not yet been crushed into flour are directed back to the roll stand by pneumatics or mechanical transport methods. A pass through the roll stand and plane sifter is known as a passage. In rough-grinding the grains are broken up by corrugated rolls. For breaking down, smooth rolls are used, by which the flour and bran are mutually separated. In full grinding, the lost particles of flour are separated out from the bran. The grain goes through eight to twelve passages before the flour is removed from the bran. In a closed housing, the grinding material, for example, the cereal, is dropped into the top of the roll stand. There, a feed roll infeeds it to the grinding gap while ensuring a steady volume flow. This grinding gap is formed by two rolls arranged horizontally or diagonally parallel that counter-rotate (like gear wheels). Various typically-adjustable parameters are decisive: (i) gap between the rolls (roll gap), (ii) differential speed (leading for corrugated rolls 1: 2.5 and for smooth rolls 1: 1.25), (ii) number of flutes, (iv) flute angle (spiral), and (v) mutual position of the flutes (ridge: ridge, ridge:blade, blade:blade, blade:ridge).

In grinding mills, the infeed devices and the rolls are arranged in such a way that advantageously the pressure on the work surfaces of the rolls is as uniform as possible. FIG. 1 shows a roll stand partly in a side view and partly in cross-section. The material is infed to the crushing rollers a and b by means of feed rolls c and d. The latter runs with the some circumferential velocity as the crushing roll b, so that no stagnation of the material onto the rolls and therefore higher load on the grinding surfaces can occur. By means of an adjusting screw e, the pusher f can be adjusted so that the teed roll c only infeeds as much material to feed roll d that the latter can pass on to the crushing rolls a and b. To prevent the material in the roll stand from overheating, stands have recently been provided with a suction device. To clean the rolls, for example, brushes that automatically press on are used.

Traditionally, the condition of the components of a grinding mill, particularly grinding rolls is monitored by a person skilled in the art monitoring the rolls and the material being ground. However, interrupting the grinding process may be required to do this, by which downtimes, and therefore production stoppages, occur. Furthermore, it depends on the experience and attention of a person skilled in the art to recognize wear, damage or insufficient product processing. Such results determined are imprecise and subjective. For objective detection of the wear of grinding rolls, comparing the actual condition with a target or initial condition has been proposed. For this purpose, to evaluate corrugated rolls, for example, profile prints of the roll surface are taken, as described in DE 10063377 A 1. Furthermore, analysis processes are proposed that use light sources and photodetectors for a visual recognition of the roll surface, as explained in WO 2017/140928 A 1. Such processes for determining the wear of grinding mils are therefore limited to the analysis of the surface condition at a given time, so that damage or loss of yield from wear that is already present are not prevented. Furthermore, such processes disregard other parameters of the grinding mil and its surroundings, which contributes to wear and may affect the productivity of the grinding mill. Furthermore, these processes are expensive and time-consuming.

Electronic monitoring processes based on a sensory data detection of measurement parameters have been developed, detecting a state, or wear, of rolls of a grinding mill, such as described in WO 2021/037525 A1. In this case, a sensor is arranged inside a grinding roll. The sensor designed to detect measurements that characterize a state of the rolls. In particular, this may relate to a state of a circumferential surface of the rolls. The state can be, for example, a temperature, a pressure, a force (component force(s) in one or more directions), wear, a vibration, a deformation (extension and/or deflection path), a rotational velocity, a rotational acceleration, an ambient humidity, a position or orientation of the rolls and are detected with appropriately designed sensors. The condition of the grinding roll is detected continuously while the grinding mill is in operation. Furthermore, a data transmitter is provided for contactless conveying of measurements of the sensor to a data receiver and further to a control unit or a superordinate control system for evaluation, by which the grinding mill or part thereof can be controlled and regulated. For example, a warning message can be emitted by a control unit if a preset warning criterion is met. For example, the warning criterion may consist of the measurement exceeding a preset imit. If the warning criterion is met, a warning signal can be emitted or the grinding mill can be stopped, for example, by the control unit. However, in this monitoring process, effects outside the grinding roll are disregarded. It may cause undesirable downtimes, loss of yield and excessive maintenance costs.

A grinding mill with grinding rolls is known from document EP 3500370 A1, in which the rolls exhibit several sensors for detecting measurements describing a state of the rolls, and which is designed to optimize the operation of the grinding mill by means of a control unit and to specify a remaining service life, and/or a wear condition, of the rolls. The sensors are, for example, designed as temperature sensors for ascertaining a temperature profile of the rolls, as vibration sensors for detecting vibration of the rolls and as accelerometer for monitoring a rotational velocity, acceleration or deceleration of the rolls, and transmit their measurements to the control unit. The control unit comprises a machine learning unit with which the roll operation, such as the width of a gap between two rolls or the parallelity of the rolls is automatically optimized, based on the measurement data received. Furthermore, by means of the machine learning unit, the remaining service life and a wear condition of the rolls is determined. In so doing, the machine learning unit comprises a monitoring unit for monitoring the measurements received and a learning unit. The monitoring unit detects, for example, the trend over time of the temperature, the gap width and rotational velocity depending on an actual and target value. The learning unit undertakes the learning process by Inking up the actual and target value. In this way, the operation of the grinding mill can be optimized by means of the machine learning unit in relation to shape, spiral and surface condition of the roll. This considers both the remaining service life and the wear condition of the grinding mill components. However, no assertion can be made on the optimization of maintenance work for upkeep of the grinding mill. This may result in unnecessary costs and downtimes, and the efficiency of the grinding mill may be affected.

SUMMARY OF THE INVENTION

It is a task of the present invention to provide a system and process for monitoring wear of components of a grinding or rolling mill, particularly for technical maintenance over the service life of such mills, which enable cost-saving and material-saving maintenance of the mill an optimum time for replacement of grinding mil components and a cost-saving and material-saving integration of the wear behavior of the mill within its life cycle. In particular, such a system and process for a grinding or rolling mill is to be provided that reduces downtimes for maintenance work and at the same time avoids excessive loss of yield, loss of quality and material consumption over the life cycle of the mill. Furthermore, for such mills, a timely indication for undertaking maintenance work and forecasting of an anticipated remaining service life of grinding rolls of these mils is to be provided. The predominant technical problem underlying the invention consists, in summary, of specifying a process and system for a mill for grinding and/or coarse-grinding particularly of cereals, by which the grinding and/or coarse grinding can be optimized and undertaken automatically, and which increases the operational safety and service life of such a grinding mill.

In accordance with the present invention, these tasks are achieved by a process and system for monitoring wear on grinding mill components and by a grinding mill with such a system with the characteristics of the independent claims. Furthermore, from the dependent claims and the relevant descriptions, further advantageous illustrative examples and variants may be derived.

A process and system for monitoring wear on components of a grinding mdl particularly for monitoring wear on grinding rolls or a grinding roll pair of a grinding mil, in accordance with the invention, ascertain an optimum future time for maintenance of the grinding mill, particularly maintenance of a grinding roll or a grinding roll pair. The process is particularly used for maintaining the grinding mill over the life cycle of the mill. In the following, the process can also be designated briefly as a monitoring process or as a maintenance process. The process is undertaken by means of a system comprising a control unit to control the grinding mill, particularly for controlling the grinding rods and/or grinding roll pairs, a sensory system for detecting measured data for technical parameters in relation to a wear condition of a component, particularly a grinding roll or a grinding roll pair, and for detecting measurement data on technical parameters in relation to an operating state of the grinding mil, an analysis unit for analyzing wear behavior of the grinding mill and at least one data transmitter and at least one data receiver for exchanging data.

The sensory system detects the measurement data on the wear condition of at least one component, particularly a grinding roll or a grinding roll pair, and the measurement data on the operating state of the grinding roll, periodically or continuously over time and provides the measurement data of the analysis unit, for example, by means of a data transmitter. The sensory system may comprise several measurement sensors to do this.

The analysis unit assigns a degree of wear of the at least one component to the measurement data of at least one of the parameters on the degree of wear of at least one component. Furthermore, the analysis unit assigns a maintenance loss to the degree of wear, which maintenance loss corresponds to a loss of grinding yield due to technical maintenance of the at least one component. The maintenance loss may, for example, be determined by a failure of a grinding yield due to a stoppage of the grinding mill and/or the costs of removal of the wear. Therefore, for example, the maintenance loss may depend on the extent and time period of required maintenance work and materials for remedying of wear on the component. From several measurement data detected at different times on the wear condition, the analysis unit derives a future wear condition at a time T in the future. The analysis unit assigns a future degree of wear and a future maintenance loss to the future wear condition. For example, the future wear condition may be ascertained by usual extrapolation processes from measurement data collected periodically or dynamically. The future degree of wear and the future maintenance loss are correlated with the future degree of wear and may therefore be derived therefrom.

In so doing, the analysis unit can be provided in a digital cloud platform. Therefore, the analysis unit of several, geographically-separate sites are used for deployment at various grinding mils. The analysis unit may therefore be updated simply and used multiple times.

Furthermore, the analysis unit assigns the measurement data for at least one parameter for the operating state of the grinding mill to a grinding yield level specifying the yield from operation of the grinding mill. The analysis unit compares the grinding yield level with a preset target yield level of the grinding mill and determines a grinding yield loss relative to the target yield level. The target yield level may, for example, be given by a technical mill specification of the mill manufacturer or operators. Also, the target yield level may be a theoretical ideal yield level for the grinding mill to be monitored calculated from the technical key data from this mil, or the target yield level may be determined by a practical test run of the mill as long as there is no wear present on the mill components. The grinding yield level ascertained from the measurement data on the operating state at an actual time is based on the wear of the grinding components, particularly grinding rolls, or grinding roll pair, generally below the target yield level specified for a grinding mil, producing a loss of grinding yield. For example, the yield from the grinding operation of the grinding mi is reduced in that, due to the wear, there is an increased energy requirement on the mill or additional passages are required to maintain grinding quality. The analysis unit derives a future grinding yield loss at a time $T_{operation}$ in the future, from several pieces of measurement data on the operating state detected at different times. The future operating state may, for example, be ascertained by extrapolation processes. The future grinding yield loss correlates to the future [operating state] and may therefore be determined from the measurement data of the operating state.

The analysis unit optimizes a maintenance time in the future, by establishing as the future maintenance time that time at which the future maintenance loss essentially corresponds to the future grinding yield loss. Advantageously, there is a dynamic optimization, in which the analysis unit incorporates periodically or dynamically actual measurement data of a wear condition of a component and actual measurement data relating to an operating state of the grinding mill continuously into the analysis of the wear behavior, and ascertains an updated degree of wear, an updated maintenance loss and an updated grinding yield loss and determines an actual, optimized future maintenance time therefrom.

The monitoring process in accordance with the present invention uses the technical parameters to determine the condition of the grinding mill and ascertains, depending on these technical parameters, precautions for technical maintenance of the grinding mill. With the monitoring process, the technical functioning of a grinding mill can be optimized over the entire life cycle of the grinding mill. In particular, undesirable or excessively long downtimes of the grinding mill can be reduced or avoided, an effect on the grinding yield can be minimized and a reduction of grinding capacity over time can be reduced. As a result, the service lie of the grinding mill can be extended and/or its profitability can be improved. The monitoring process also supports careful usage of materials and other resources.

In an advantageous variant of the monitoring process in accordance with the invention, the analysis unit ascertains from the measurement data on the technical parameters relating to a wear condition of a component and/or from the measurement data on the operating state of the grinding mill, at least one specific maintenance task required for specific wear. Advantageously, the analysis unit sets a future maintenance time for this required specific maintenance task as that time at which the specific future maintenance loss resulting from this specific wear corresponds to the specific future grinding yield loss resulting from this specific wear. Examples of specific maintenance tasks are a replacement of a roll shaft, a roll stump or a roll bearing or the entire roll, balancing out of the rolls and grinding and polishing for smooth rolls. The monitoring process may set a future maintenance time for each such specific wear.

In a further advantageous variant of the monitoring process in accordance with the invention, the analysis unit aggregates measurement data from various parameters on the wear condition of at least one component and/or various parameters on the operating state of the grinding mill by means of an aggregation module. On the basis of the aggregated measurement data, the analysis unit of the at least one component can be assigned to an aggregated degree of wear and an assigned aggregated wear loss. Furthermore, the analysis unit of the operating state of the grinding mil can be assigned to an aggregated grinding yield loss. For example, in the aggregated degree of wear, measurement data may be affected in relation to temperature, vibration and rotational velocity of a grinding roll, the gap distance of a grinding roll pair, ambient humidity etc. In the aggregated grinding yield loss, measurement data on energy consumption of the grinding mill, the quantity and quality of the grinding yield etc. may be incorporated. A plurality of measurement sensors of the sensory system can detect measurement data on various parameters and transfer them to the analysis unit. The analysis unit aggregates the plurality of measurement parameters for an aggregated wear condition, and/or an aggregated operating state. In so doing, advantageously, various parameters can also be weighted. For example, parameters for determining wear of a component that have a high relevance, may have a higher weighting than parameters that are less relevant.

Advantageously, measurement data for various types of wear may also be considered, such as the specific types of wear mentioned above, and/or various components, and be aggregated into a common degree of wear of the component or the entire grinding mill. The various types of wear and components can therefore be in turn assigned a different weighting.

By using aggregated measurement results, it is possible to incorporate the effect of various wear types and their effects on the operation of the grinding mill in determining the maintenance loss and the grinding yield loss. A complete consideration can be made, in which the individual influencing factors on the technical overall efficiency of the grinding mill are considered.

For the monitoring process in accordance with the invention, the sensory system of the monitoring system advantageously comprises several measurement sensors which are arranged distributed in or close to the grinding mill. Preferably, measurement sensors are used which detect the measurement data on a temperature of components, a roll profile and/or a roughness of grinding rolls of the grinding mil, a rotational velocity of the grinding rolls, a vibration of the grinding rolls, a gap of rolls of a grinding roll pair, energy consumption of the grinding mill production quantity of the grinding mill, a grinding level of the material being ground, a time since last maintenance and/or downtimes of the grinding mill. The measurement sensors for determining the roll profile of corrugated rolls particularly detect a contour of the flute e.g. its angle, gradient, rounding off, etc. For smooth rolls, particularly the surface structure is detected. The measurement sensors may also be designed as sensor units with several construction elements. For example, an optical sensor unit may be provided comprising a light emitter and a light receiver, such as a camera.

In an illustrative example of the monitoring system. For example, at least one temperature sensor and a vibration sensor are arranged on a grinding roll of the grinding mil. Furthermore, the grinding mill may advantageously comprise a data transmitter and a microprocessor to provide measurement data on the grinding roll for the analysis unit.

In so doing, a type of roll wear measurement device is provided on the grinding roll.

In a further advantageous variant of the monitoring process in accordance with the invention, the analysis unit makes a forecast of the future maintenance loss and the future grinding yield loss, by means of a regression module and/or an interpolation module. The regression module uses, for example, the temperature, the surface condition and the vibration of a grinding roll as independent parameters to determine the behavior of the degree of wear and ascertain this for the future. Also, the energy consumption, grinding level of the material to be ground and its quantity may be used to determine the grinding yield loss, to ascertain a value therefrom for the future. By deploying a regression or interpolation module, proven statistical processes for reviewing the technical condition of the grinding mill and for determining the wear behavior may be utilized.

In turn, in a further advantageous variant of the monitoring process in accordance with the invention, the analysis unit comprises a module for machine learning and may automatically ascertain the future maintenance loss and the future grinding yield loss, particularly these values can be optimized automatically. With the module for machine learning, machine learning module for short, it is possible to optimize the future maintenance time self-adaptively. The machine learning module may be designed for various types of machine learning, for example, for monitored learning, non-monitored learning, partially-monitored learning, corroborative learning, transductive learning, multi-task learning and similar. Using the machine learning module, the analysis unit can continuously adapt the analysis process, wherein the measurement data continuously detected by the sensory system and target value for the operation of the grinding mill can be used.

In an advantageous extension of this variant of the monitoring process in accordance with the invention, the module for machine learning sends a control signal to the control unit for regulation of the operation of the grinding mil, wherein the operation of the grinding mill is optimized corresponding at an advantageous and/or desired maintenance time, self-adaptively in such a way that the future maintenance time corresponds to the advantageous maintenance time. In the life cycle of the grinding mil, in the practical deployment of the mill, various times may be provided for a maintenance task. For example, maintenance of the mill may be provided for advantageously, if the grinding mill is adopted to a different grinding material or the mill is to be stopped for other reasons, for example, even non-technical ones. Such an advantageous maintenance time may be before or after a future maintenance time that is ascertained by the monitoring system. Through the machine learning module, an optimized operation of the grinding mill may be determined therefrom in a reverse conclusion.

In so doing, advantageously an optimization of the operation of the grinding mil may occur by optimization in relation to a parallelity of grinding rolls of a roll pair, a mutual gap of the grinding rolls and/or a rotational velocity of the grinding rolls, based on the future maintenance loss ascertained from the module on machine learning, and the future grinding yield loss. If, for example, an advantageous maintenance time is only somewhat later than a future maintenance time ascertained by the analysis unit, the operation can be optimized to the effect that, from the control unit, a somewhat resource-saving or energy-saving grinding operation or similar is set. This may, for example, be the case with unforeseen events that make normal maintenance procedures impossible, in contrast to this, if the advantageous maintenance time is earlier than a future maintenance time ascertained by the analysis unit, the operation can be made more intense, by which faster wear may occur, however, that can be remedied already at the earlier advantageous maintenance time.

In a further advantageous variant of the monitoring process in accordance with the invention, in addition to the measurement data from the sensory system, specification data on the grinding mill and/or a material to be ground are processed from a data pool to optimize the maintenance time in the future, for determining the future maintenance loss and future grinding yield loss. The data pool may, for example, be provided by means of a cloud platform. The data pool advantageously provides data relating to a specific grinding mill, particularly data on costs of material and labor in a maintenance task, energy costs for operation of the grinding mill at the site of the mil and/or information on grinding material, such as advantageous temperature ranges for grinding, normal number of passages required, purchase price of grinding material or sale price of the ground flour. Advantageously, these specification data may continuously be adapted to actual values, so that also at the future maintenance time, actual specification data can be considered. Advantageously, the data pool may provide measurement data on technical parameters in relation to a wear condition of a component and/or an operating state of other, comparable, grinding mills, to determine the future maintenance loss and optimizing the future grinding yield loss by comparison and/or incorporation of these pieces of measurement data. In this way, the module for machine learning can learn from these other, comparable grinding mils and further improve the optimum maintenance time further self-adoptively.

The monitoring system in accordance with the invention is advantageously constructed from units and/or modules that are provided at least partially in the cloud platform. In addition, the cloud platform can be used as a data memory for the measurement data. The cloud platform is used as a large central database and provides working units for implementing the process which can be used for various grinding mills at distributed sites. The monitoring system on the individual grinding mills can therefore be designed in a simplified and cost-saving way.

In a further advantageous variant of the monitoring system in accordance with the invention, an output unit may visually display a degree of wear of at least one component and/or a maintenance loss in relation to at least one component and/or a grinding yield loss of the grinding mill as a curve over time. Advantageously, in so doing, even future values and the ascertained future maintenance time are displayed. An operator of the grinding mill con read off the trend of the mi wear in a simple way from the display. In this way, the individual degrees of wear and wear losses on the various components, the projected values and also the aggregated values are displayed. Advantageously, the output unit comprises a visualized, tailored dashboard format designed in such a way that wear reports, recommended future maintenance times with forecasts, and/or with recommendations on replacing rolls and information on grinding operation and its optimization are displayed automatically. The operator may be sent the reports to their personal business account, improving process transparency. For example, a manufacturer of grinding mils may provide servicing software in which individual data of the operator and data on its grinding mill can be administered. The operator uses this servicing software by setting up a business account on the software platform, to make the data and information on the grinding mill accessible to an operator in a simple and transparent way.

In yet another advantageous variant of the monitoring process in accordance with the invention, the measurement data on technical parameters in relation to a wear condition of a component and an operating state of the grinding mdl are loaded by means of the data transmitter into a cloud platform and/or the data pool with data relating to a specific grinding mill and/or data relating to other, comparable grinding mils may be provided in a cloud platform. The decentralized warehousing, storage and processing is useful for process security and extends the processing volume. In this way, with the monitoring process, a more reliable maintenance schedule can be compiled and continuously updated without delays, as is only conditionally the case with local storage capacities.

In a further advantageous variant of the monitoring process in accordance with the invention, a servicing module of the monitoring system, based on the ascertained future maintenance loss and the future grinding yield loss, automatically recommends a cycle of maintenance for the grinding mill. In addition or alternatively, the servicing module may make an offer for a maintenance task of the component and/or a compile relevant maintenance order automatically. For example, a servicing module derives a required maintenance procedure for this from the wear condition ascertained. The procedure may comprise a cycle of individual maintenance activities and list of equipment that it is be replaced. From this, an offer with schedule and costing can be compiled automatically. An operator of the grinding mill can accept this offer, by which the maintenance procedure can be activated automatically. In this way, equipment can be ordered and maintenance staff can be booked.

In a next advantageous variant of the monitoring process and monitoring system in accordance with the invention, a means of identification is provided on at least one of the monitored components, particularly on a grinding roll. The means of identification exhibits electronically-stored data in relation to the component. Through the means of identification, the component of the grinding mill can be uniquely identified. For example, the means of identification can be provided with individual data on the component and in relation to at least one characteristic of the roll, such as at least one of its dimensions, its dishing and/or a product number. To do this, the component may, for example, exhibit at least one data memory that is, for example, designed as an RFID chip. The data stored in the data memory may, advantageously, be transferred contactlessly by means of a data transmitter to the analysis unit. In this way, it is possible that the data of the means of identification are transmitted by means of the same data transmitter, by means of which the measurement data relating to the wear condition and the operating state are transferred.

The task of the present invention is also solved by a grinding mill with grinding roll, particularly with corrugated or smooth rolls, comprising a system as described above. The grinding mill in accordance with the invention is preferably designed for grinding wheat and/or rye and/or durum wheat and/or oats and/or barley and/or peas and/or chick peas and/or pulses and/or rape and/or soya and/or cacao and/or coffee as a grinding material.

In a simple example of the application of the monitoring system and process in accordance with the invention, measurement parameters of the roll wear measurement device are uploaded to a digital cloud platform and the measurement parameters measured by the roll wear measurement device are automatically analyzed by the analysis unit of the digital platform. An operator may be sent an automated display of the wear results as reports with forecasts and recommendations for roll replacement and information on process transparency and optimization and in the visualized, tailored dashboard format on their personal business account. The analysis unit links the measurement results to the servicing module for compiling a corrugated and smooth roll overhaul and replacement service and for automatically compiling an offer and a corresponding order for the overhaul/replacement services of corrugated and smooth rolls. An identical procedure may be used for other components, such as, for example, feed rolls, actuators, infeed equipment and similar.

With the system and process for monitoring wear on components of a duly equipped grinding mdl, the maintenance of the mill and the production of material that has been ground over the entire life cycle is improved and optimized. The quality and quantity of the grinding result is sustainably improved. Regressive yield of the grinding mill is avoided.

BRIEF DESCRIPTION OF THE DRAWINGS

Advantageous illustrative examples of the invention shall be illustrated in the following using the figures, which are only for the purpose of information and are not to be interpreted as restrictive. Characteristics of the invention becoming apparent from the figures are to be considered as forming part of the disclosure of the invention individually and every combination. In the figures:

FIG. 7 shows: Example measurement report for wear analysis from FIGS. 6*a* & 6*b*.

FIG. 9*a* shows: Example measurement report for wear analysis from FIGS. 8*a* & 8*b*.

FIG. 9*b* shows: Example analysis report for wear analysis from FIGS. 8*a* & 8*b*, FIG. 9*c* shows: Example measurement report for wear analysis from FIGS. 8*a* & 8*b*.

DETAILED DESCRIPTION OF PREFERRED ILLUSTRATIVE EXAMPLES

Figure 1:
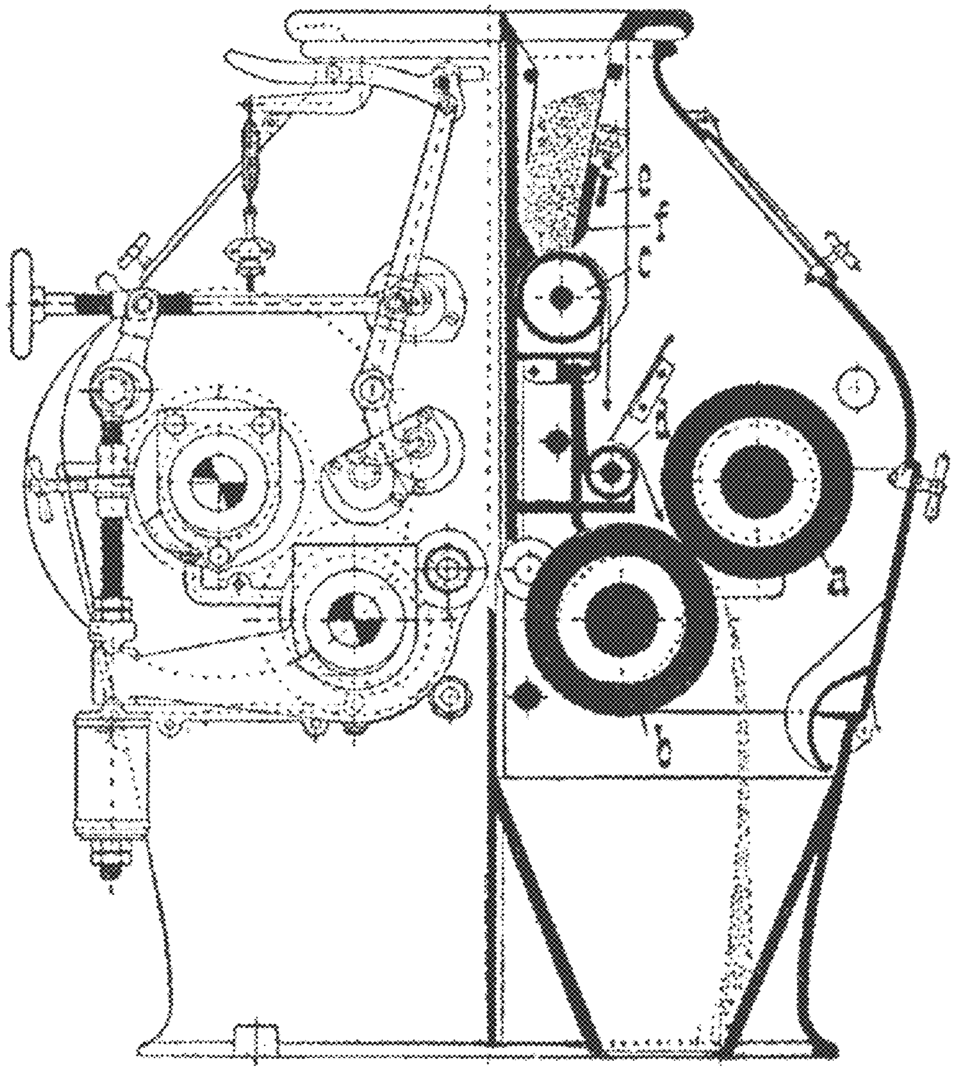
FIG. 1 shows: a roll stand of a grinding mill according to the prior art, partially in side view and partially in cross-section.

As an introduction to the field of the invention. FIG. 1 shows components of a roll stand of a grinding mill partially in side view, partially in cross-section, as is known from the prior art. The grinding material is infed to the crushing rollers a and b by means of feed rolls c and d. The latter runs with the some circumferential velocity as the crushing roll b, so that stagnation of the material onto the rolls and therefore higher load on the grinding surfaces can never occur. By means of an adjusting screw e, the pusher f can be adjusted so that the feed roll c only infeeds as much material to feed roll d that the latter can pass on to the crushing rolls a and b. To prevent the material in the roll stand from overheating, stands have recently been provided with a suction device. To clean the rolls, for example, brushes that automatically press on are used.

Figure 2:
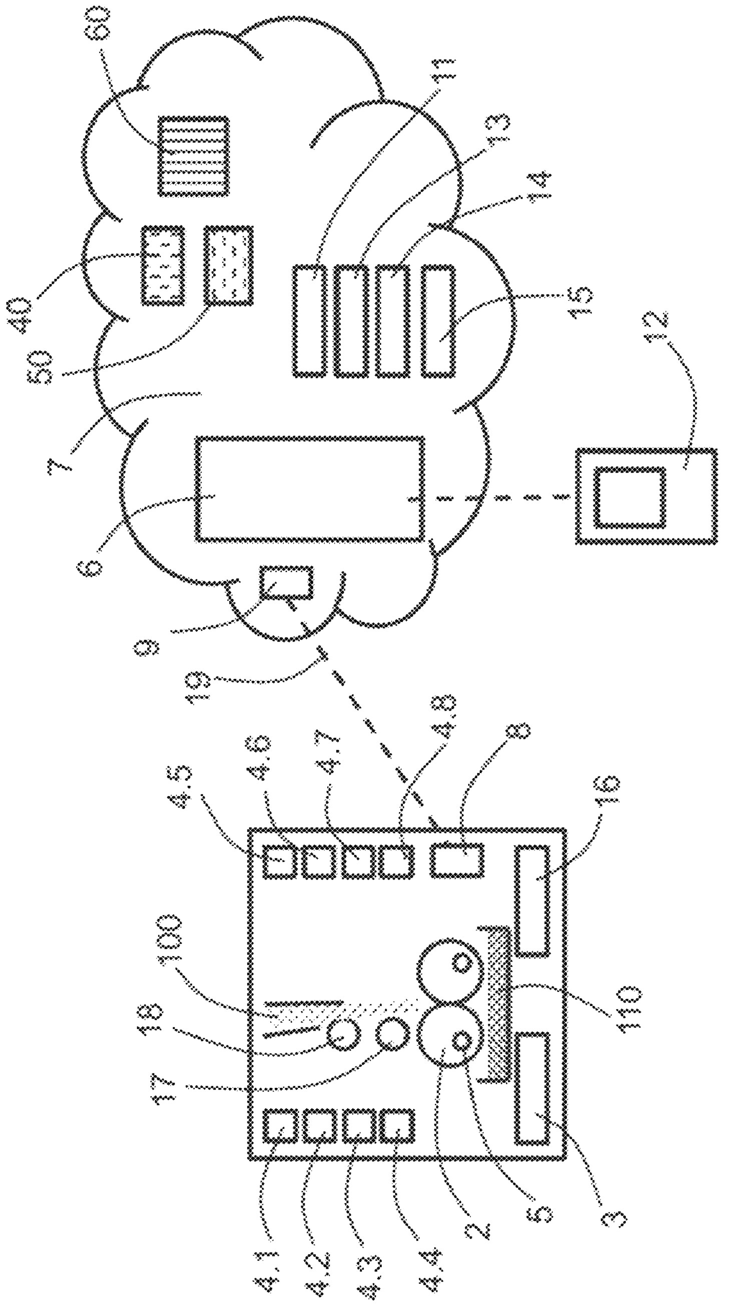
FIG. 2 shows: a schematic illustration of a system for monitoring wear on components of a grinding mill, particularly on grinding rolls of a grinding mil, in accordance with the present invention.

A process and system for monitoring wear on components of a grinding mill and for maintaining the grinding mill in accordance with the invention and variants thereof are explained in the figures by way of example and in extracts. As an overview, FIG. 2 illustrates such a monitoring system schematically. A grinding mill 1 for processing and/or for grinding a grinding material 100 into a ground product 110 comprises at least one pair of grinding rolls 2, which correspond to the crushing rolls a and b from FIG. 1. In the following, the grinding rolls 2 are representative of various components of the grinding mill, the wear of which is monitored with the system in accordance with the invention, to simplify explanation of the invention.

Furthermore, the monitoring system comprises a control unit 3 for controlling the grinding mill, particularly of the roll par 2, which control unit is arranged advantageously in the girding mill. Furthermore, a sensory system 4 for detecting measurement data on technical parameters in relation to a wear condition of a component, particularly of the grinding rolls, and an operating state of the grinding mill is provided. The sensory system 4 comprises a plurality of measurement sensors for detecting measurement data on technical parameters in relation to a wear condition of a component and/or an operating state of the grinding mill. For example, the sensory system comprises one or more temperature sensors 4.1 for measuring the temperature of the grinding rolls 2, their environment and/or the ground product 110, one or more vibration sensors 4.2 for measuring a vibration of the grinding rolls 2, one or more accelerometers 4.3, preferably at least one for each one grinding roll 2, one or more moisture sensors 4.4 for detecting the moisture of the environment of the grinding rolls 2 and/or the ground product 110, an energy consumption sensor 4.5 for detecting energy consumption of the grinding mill 1 and sensors 4.6 for detecting measurement data on quality and quantity of the ground product 110. Furthermore, measurement sensors 4.7 for ascertaining a surface characteristic, and/or a surface condition, a gap of the grinding rolls 2 and the mutual parallelity of the grinding rolls 2 and measurement sensors 4.8 for ascertaining a means of identification 5 of the grinding rolls 2 are provided. The measurement sensors 4.1-4.8 of the sensory system 4 detect wear measurement data 40 on technical parameters relating to a wear condition of a component, particularly the grinding rolls 2 of the grinding mill 1, such as the characteristics of the roll surface, the roll gap, the roll parallelity and the roll temperature. Furthermore, the measurement sensors 4.1-4.8 of the sensory system 4 detect operating measurement data 50 on technical parameters of an operating state of the grinding mill 1, such as energy consumption, ambient temperature and moisture, rotation and/or change of rotation of the grinding rolls 2 and measurement data on quality (e.g. graininess of the ground product) and quantity (such as a weight, and/or a change of weight of the ground product). The sensory system detects the measurement data 40 on the wear condition of at least one component and the measurement data 50 on the operating state of the grinding mill periodically or continuously over time, so that there is a series of measurements extending over a defined period of time. The defined period of time may extend, for example, from a commissioning of the grinding mill or from the last maintenance task or from other predetermined events of the grinding mill.

An analysis unit 6 of the monitoring system analyses a behavior of the grinding mil 1 in relation to a wear of the components and/or a wear-dependent change of the operation of the grinding mill over time. The analysis unit 6 may be provided in a computational device, such as a computer, of the grinding mill 1. Advantageously, the analysis unit 6 in accordance with the invention is, however, provided in a cloud platform 7. In such a way, the analysis unit 6 may be a component of a monitoring system for various, mutually independent grinding mills. By using a cloud platform as a central point for the analysis unit 6, furthermore, a high working capacity for the system is provided and the computational device of the grinding mill can be designed with a lower working capacity. The measurement data 40 and 50 detected by the sensory system 4 on the technical parameters of the grinding mill 1 are provided by one or more data transmitters 8 present in the grinding mill 1, preferably contactlessly for the analysis unit 6. The data transmitters 8 may advantageously be provided on the component to be monitored or in their immediate vicinity. For example, a data transmitter may be provided on a grinding roll, preferably on both grinding rolls 2. Further data transmitters may be provided on an energy supply to the grinding mill, in a storage room of the grinding material 100 and/or a storage room for the ground product 110. Advantageously, the measurement sensors may be equipped with the data transmitters. The data may be transmitted by means of a network connection to the analysis unit 6 and/or to the cloud platform 7. Advantageously, the measurement data are stored in a storage space in the cloud platform 7 and provided to the analysis unit 6. To receive the measurement data, the analysis unit 6 and/or the cloud platform 7 comprises at least one data receiver 9.

Furthermore, the system for monitoring wear on components of a grinding mill in accordance with the invention comprises a data pool 10. The data pool 10 is advantageously also provided in the cloud platform 7, but may also, for example, be accommodated in the computational unit of the grinding mill 1. The data pool may contain additional data that are helpful for an analysis of wear and a future maintenance time. For example, specification data 60 of the grinding mill 1 can be stored in the data pool. The specification data 60 may comprise mil-specific data and thresholds for the grinding production, such as target yield level, a target temperature level for the grinding rolls 2 and/or the grinding material 100 and/or the ground product 110, a target moisture level for the ground product, target values for the surface characteristics, parallelity and gap of the grinding rolls 2, measurement data of the grinding rolls 2, information on grinding material 100, information relating to costs, availability and anticipated energy consumption of components, information on the ground product 110, such as target temperature, target moisture and sale value. The specification data 60 may be continuously updated in the data pool 10, so that the analysis unit 6 can be provided with current specification data 60 at any time.

The totality of the data detected over time consisting of wear measurement data 40, operating measurement data 50 and any specification data 60 form a multi-dimensional data space forming the basis for the analysis unit 6 for ascertaining an optimum maintenance time in the future for maintenance of wear and for maintenance of the grinding mill. To do this, the analysis unit shows a future wear curve, a future maintenance loss and a future grinding yield loss configured with an analysis algorithm ascertained from the data available in the data space. From these projections, the analysis unit then ascertains an optimum future maintenance time. Essentially, statistical processes and/or experimental modeling processes can be used to analyze the data and for a curve forecast, in which confidence levels and probabilities inked to the parameters can be predefined. The analysis unit 6 may also comprise a module for machine learning 11 that automatically optimizes ascertaining the future maintenance time. The machine learning module 11 accesses the data in the data space to do this and uses the machine learning processes, particularly processes based on a pattern recognition, continuously to improve the analysis of a wear curve. In this way, the machine learning module 11 identifies the contexts in patterns in an analyzed dataset from the data space and uses these contexts on the new datasets, such as on datasets of other grinding mils or of other time windows of the data detection. So, it is advantageous to use an algorithm based on monitored learning. The algorithm is thus trained with existing series of measurement data and relevant known wear characteristics and relevant yield losses. The time for the maintenance task is ascertained as a target variable, at which a total grinding yield loss is optimized. Alternatively, an algorithm based on unmonitored learning can also be used, particularly if only fewer pieces of comparison measurement data are available for a context between wear and grinding yield loss.

The system for monitoring wear on components of a grinding mill in accordance with the invention may further comprise an output unit 12 which displays visually the results from the data analysis, particularly the curve of wear and a determined future maintenance time, as a curve over time. Advantageously, a curve beyond the maintenance time is shown, to illustrate the anticipated wear curve and grinding yield loss, if wear is not remedied, therefore no maintenance is carried out. The output unit 12 may be provided on the grinding mill 1, such as on the computational unit. Furthermore, the output unit 12 may be designed on a mobile device, such as a smartphone or tablet, which communicates with the analysis unit over a network. As well as the visual illustration of a curve of the technical parameters and of analysis results, quantitative information in relation to an operating state and a wear curve can be shown. Examples of a graphical illustration of the results from the monitoring process are explained in the context of FIG. 7 and FIG. 9*a* to 9*c*.

Furthermore, the monitoring system in accordance with the invention may comprise a servicing module 13 that, preferably, based on the analysis results, recommends a cycle for maintenance of the grinding mill and/or gives an offer of maintenance of components and/or a maintenance order automatically. The servicing module 13 may, for this purpose, for example, relate to specification data 60 from the data pool 10, such as availability of replacement components, costs of the components, labor costs, etc. The offer may advantageously be shown on the output unit 12. Advantageously, the servicing module 13 is provided in the cloud platform 10 and may be the component of several monitoring systems provided for various grinding mils.

Figure 3:
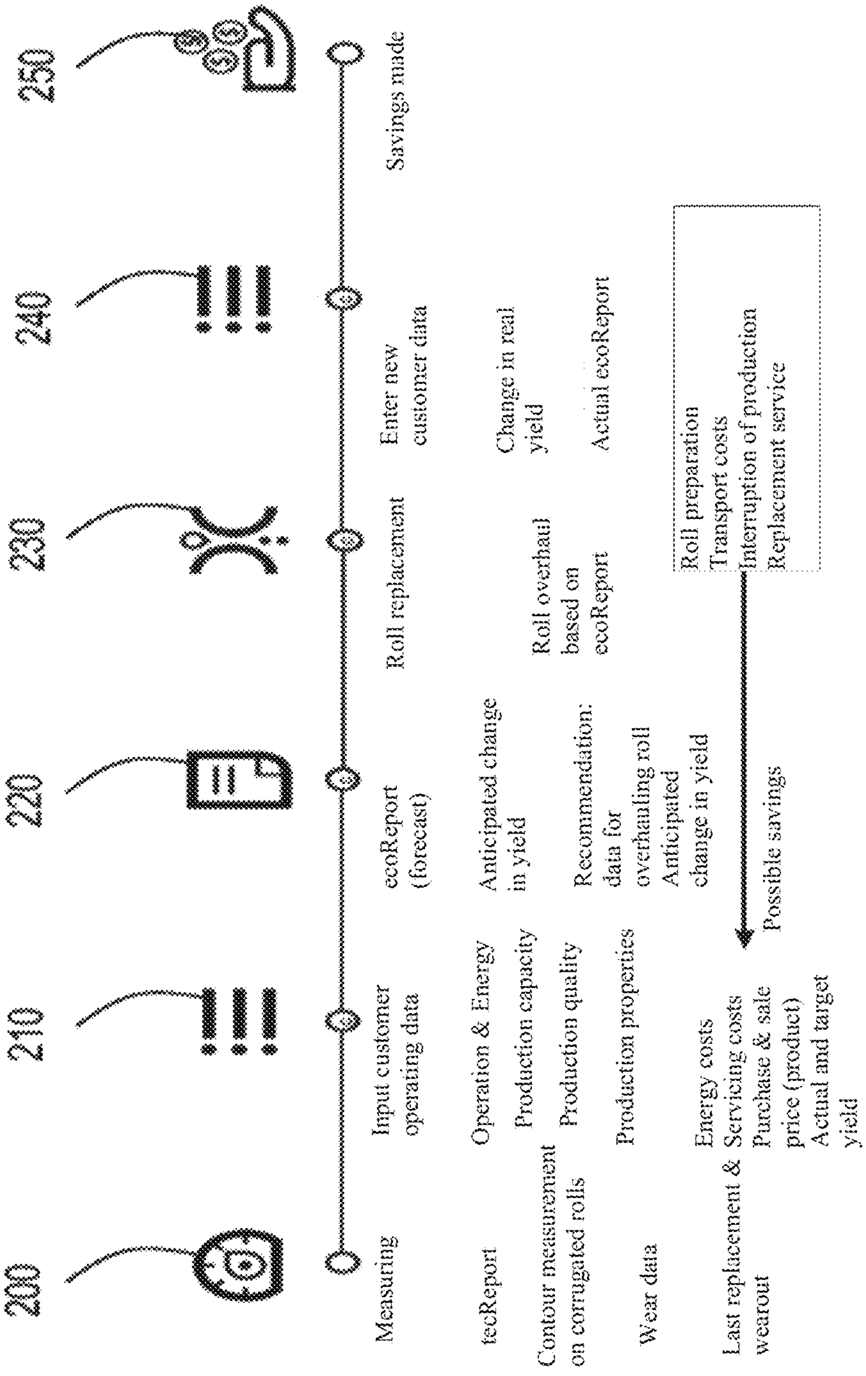
FIG. 3 shows: a schematic illustration of the flow of the process for monitoring wear on components of a grinding mill in accordance with the invention.

FIG. 3, for example, illustrates a process for monitoring wear on components of a grinding mil, particularly on grinding rolls of a grinding mill, in accordance with the invention. The individual steps of the process curve may, in this case, essentially flow in real time and continuously or the process may be undertaken at predetermined time intervals, by which the analysis results can be updated periodically. Alternatively, the process may also be triggered by manual activation, for example, if an update is desired. Initially, in the monitoring process in accordance with the present invention, in a data detection step 200 by the sensory system 4, the measurement data 40 on the wear state of at least one component and the measurement data 50 on the operating state of the grinding mill are detected periodically or continuously over time. The measurement data 40 and 50 are provided as described above, for the analysis unit 6. In a further data collection step 210, the specification data 60 are provided for the analysis unit 5. As shown in this process example, the specification data 60 may contain information on the production capacity, production quantity, on the energy costs, the prices for buying in and selling the grinding material and ground product and a target yield level. In particular, the specification data may comprise information in relation to specific maintenance work, such as costs for overhaul and replacement of a grinding roll, transport costs, costs on the basis of a production failure and labor costs. The specification data 60 may, for example, be called up from the data pool 10, stored in the computational unit of the grinding mill or otherwise made available.

In an analysis step 220, the analysis unit 6 assigns the measurement data 40 to at least one parameter on the wear condition of at least one component of a degree of wear and the degree of wear a value for a maintenance loss 300 (see FIG. 4), corresponding to the yield loss based on technical maintenance of the at least one component. Furthermore, the analysis unit derives from several pieces of measurement data 40 detected of different times on the wear condition, a future wear condition at a time in the future and assigns the future wear condition to a future degree of wear and a future maintenance loss 310. At the some time, the analysis unit assigns a grinding yield level that specifies the yield from operation of the grinding mill to the measurement data 50 for at least one parameter of the operating state of the grinding mill, and determines a grinding yield loss 320 relative to a target yield level of the grinding mill 1. Furthermore, the analysis unit 6 derives a future operating state from several pieces of measurement data 50 detected at different times on the operating state, and derives a future grinding yield loss at a time in the future therefrom. From these analysis steps, the analysis unit 6 ascertains an optimized maintenance time in the future TW, by establishing as the future maintenance time TW that time of which the future maintenance loss 310 corresponds to the future grinding yield loss. The individual analysis values 300, 310, 320 and the future grinding yield loss, and also the future maintenance time TW may be ascertained by the analysis unit 6 by means of statistical process and/or empirical modeling process, as listed above. For example, the analysis unit 6 may compile a forecast of the future maintenance loss and future grinding yield loss by means of a statistical module 14 of the monitoring system, such as a regression and/or interpolation module. The statistical module 14 may be provided in the analysis unit 6 and/or the cloud platform 7. In particular, the statistical module 14 may be a component of the module for machine learning 11. The module for machine learning 11 can further improve on the basis of the machine learning process, as previously mentioned, the analysis of the data and determination of the future maintenance time TW. After ascertaining the analysis results, these are mode available to the operator of the grinding mill 1 in an analysis report by means of the output unit 12, such as, for example, is explained in more detail in FIGS. 7 and 9*a* to 9*c*. Furthermore, in so doing, a maintenance schedule for maintenance of the grinding mill 1 can be proposed to the operator by means of the servicing module 13 and the output unit 12. Finally, the analysis unit may advantageously transfer at least the actual degree of wear and the actual grinding yield value to the control unit for automated control of the grinding mill. Preferably, the forecast values are also sent to the control unit for optimization of the control of the grinding mill.

In addition. FIG. 3 depicts the further procedure for maintenance and upkeep of the grinding mill 1. In a maintenance step 230, the maintenance schedule is implemented in accordance with the offer from the servicing module 13. In an updating step 240, the operating data and specification data, if required, are updated. For example, the time of the last maintenance of the relevant components and their identification characteristic are stored and an updated target yield level can be detected. Optionally, in a concluding step 250, for example, by means of the analysis unit 6, the maintenance work can be invoiced. Therefore, for example, a comparison value can also be determined and specified, which shows the loss amount that has been avoided, by the grinding mill having been maintained at the ascertained optimized maintenance time instead of an earlier or later time. The loss amount therefore corresponds to an amount that has been saved by maintenance having been carried out at the optimized maintenance time.

Figure 4A:
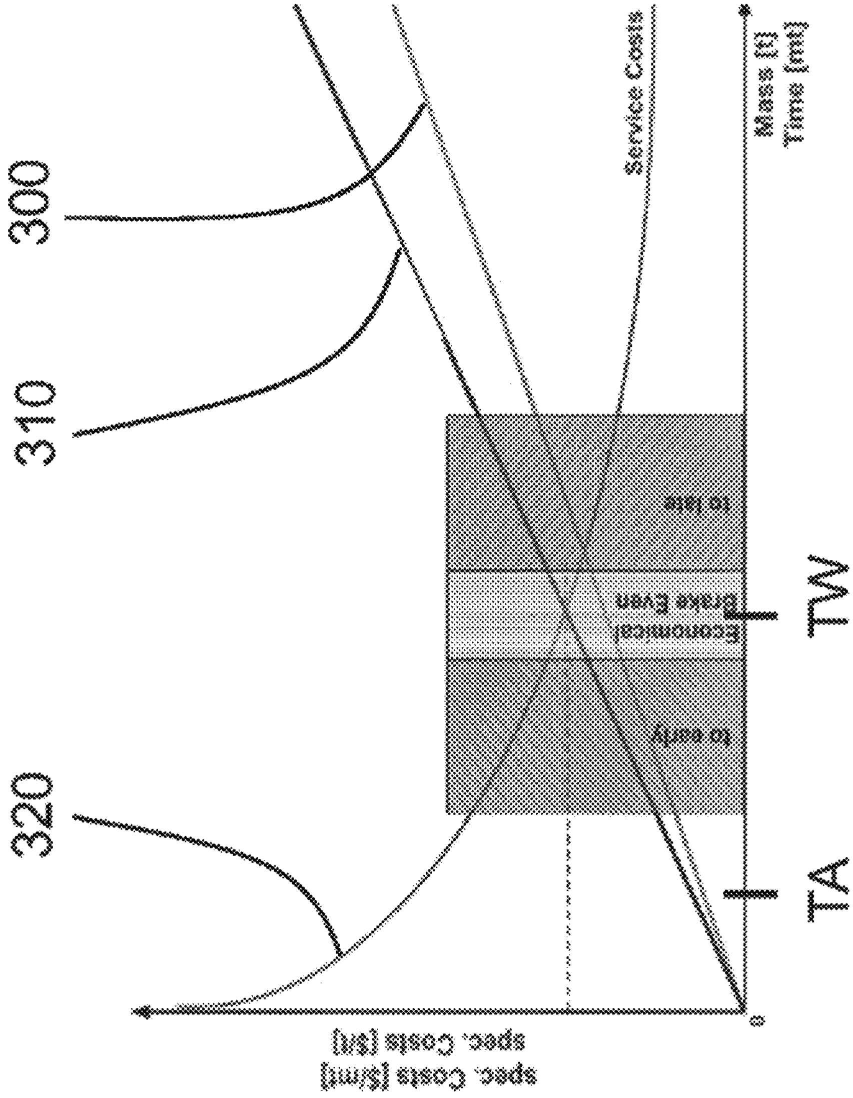
FIGS. 4*a* & 4*b* show: a graphical illustration of an analysis by an analysis unit of a monitoring system in accordance with the present invention.

FIG. 4*a* shows a graphical illustration of the results of an analysis of the analysis unit 6 according to the monitoring process in accordance with the present invention. The graph gives on the x-axis units for a curve over time and/or a measurement unit for a missed grinding yield and a loss due to increased energy consumption caused by wear of the grinding components. On the y-axis, the graph specifies cost units for these measurement units and/or a curve of the costs over time. The graph is standardized in such a way that no costs, no missed grinding yield and no loss results from increased energy consumption, as long as the grinding mill produces a yield corresponding to the target yield level for the mill. The energy loss curve 300 and a yield loss curve 310 therefore start at the origin of the graph. Over time, the degree of wear of components of the grinding mill increases and the grinding yield when operating the grinding mill decreases. This means that the value of the missed grinding yield and the loss increase due to increased energy consumption. In the example shown, the analysis unit ascertains a linear rise for the missed grinding yield and loss due to increased energy consumption over time. The graph also shows the curve of yield loss due to a maintenance task on the grinding mill over time and/or the age of the grinding mil, displayed as maintenance loss curve 320. When starting to operate a grinding mill, particularly when commissioning a grinding mill, at time zero there is no or only negligible wear on the components of the grinding mill. However, should a maintenance task be undertaken, for example, only for inspection of the components, the grinding mill must be stopped, by which maintenance loss caused by the maintenance arises. The maintenance loss is composed, for example, of the missed yield, if grinding operation has stopped, and the expense of undertaking the maintenance or inspection. At the start of commissioning the grinding mill, therefore, the maintenance loss is very high. With increasing age and therefore increasing wear of the components, the maintenance loss decreases. In the example shown, the analysis unit has ascertained an exponential drop in curve 320. It is stressed that curves 300, 310 and 320 [sic] on loss values of the grinding mill are only determined for a period in the past by measurement data. For a period in the future, the curves are ascertained by the analysis unit on the basis of measurement data, such as from specification data and possibly from additional information that is available. At an actual time TA, therefore, a maintenance time TW in the future can be established optimally, by determining that time at which the future maintenance loss, illustrated by curve 320, corresponds to the future grinding yield loss, illustrated by curve 310. It is noted that, instead of separate curves for the energy loss curve 300 and the yield loss curve 310, a grinding yield loss curve may be ascertained that is based on the aggregated data on these curves. The aggregated grinding yield loss curve therefore reflects the composite value of all factors that reduce the grinding yield due to wear.

Figure 4B:
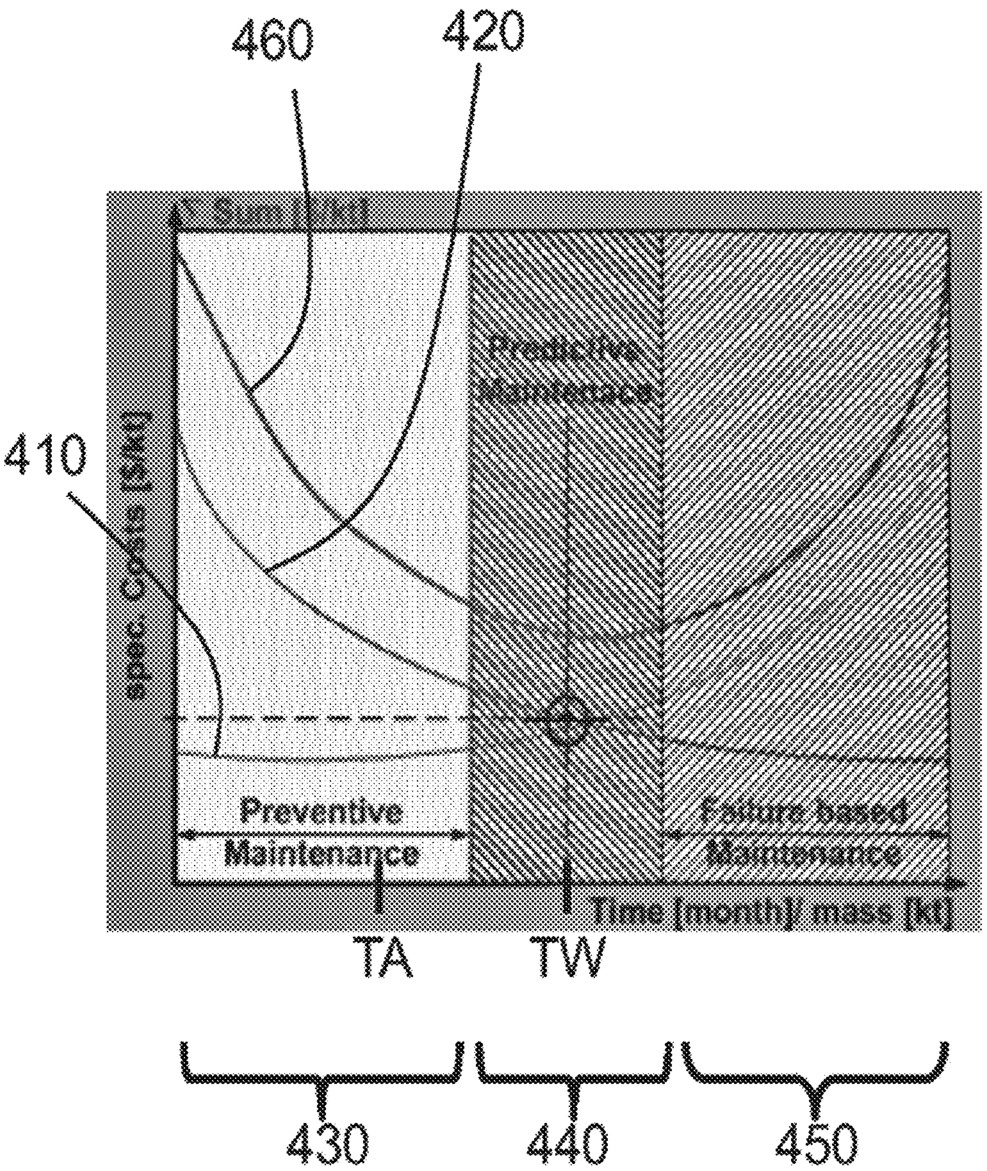

FIG. 4*b* shows a graphical illustration of the results of an analysis of the analysis unit 6 on another grinding mill. The x-axis and the y-axis correspond to the axes from FIG. 4*a*. In this case, the aggregated grinding yield loss curve 410 is ascertained, that specifies the loss in grinding yield, which is caused by a missed profit and increased energy costs by aging and wear of the mill components. The curve does not start at the origin of the graphs as, at this time, grinding yield loss is already present. A maintenance loss is specified by the maintenance loss curve 420. As in the preceding example, the maintenance loss decreases exponentially over time. An optimized maintenance time in the future is ascertained by the intersection of graphs 410 and 420, at which the future maintenance loss corresponds to the future grinding yield loss. The curve of the total loss is specified by graph 460, for which the grinding yield loss and the maintenance loss are added together. FIG. 4*b* also defines time ranges corresponding to a time period for preventive maintenance 430, a time period for forecast, optimized maintenance 440 and a time period for maintenance due to failure of components 450. An actual time TA is generally in the range 430 of preventive maintenance, in which, however, a higher yield loss is present when the grinding mill is stopped than can be compensated for by the maintenance. A future, optimum maintenance time TW is the time period for a forecast, optimized maintenance 440, in which the curves 410 and 420 mutually approach in which the peak of the overall loss curve 460 is located. Around this peak, the total loss curve 460 runs at least approximately horizontal, so that the total loss curves at different times differ only slightly in this range. The time period for a forecast, optimized maintenance 440 could, for example, be determined by a range of the total loss curve 460, in which the curve exhibits a gradient of less than 15 degrees, preferably less than 10 degrees and particularly preferably less than 5 degrees. Therefore, an optimized maintenance period is produced in the sense of the present invention. Later maintenance removes the risk of stoppage of the grinding mill due to failure of grinding components, which causes a massively increased grinding yield loss.

In summary, using the present invention, the operation of the grinding mill is improved by maintenance and upkeep optimizing the mdl. This is done by technical monitoring of the mill components and the products processed with the mill. Furthermore, the operation is improved by digitalizing the monitoring and displaying the results of this monitoring transparently and comprehendibly. A process and system in accordance with the present invention are suitable for measuring the wear condition of cereal processing rolls including corrugated and smooth rolls for corresponding grinding material by using a roll wear measurement device. Measurement parameters of the roll wear measurement device are advantageously uploaded to a digital cloud platform, and the measurement parameters measured by the roll wear measuring device are automatically analyzed by the analysis unit of the digital platform. A user is sent an automated display of the wear results and reports with forecasts and recommendations on replacing rolls and additional process transparency/optimization in a displayed, tailored dashboard format to their personal business account, that can be made available to them as a service by the mill manufacturer. For an operator of a grinding mill, it is of the utmost importance to avoid yield losses and downtimes. Yield losses arise, from a technical perspective, particularly from the abrasion of components of the grinding mill which causes a drop in throughput. When grinding rolls for grinding of grinding material are worn, a high contact pressure of the rolls of a grinding roll pair is required, by which the energy consumption of the grinding mill increases.

FIG. 5*a* to 5*d* show the various examples of surface characteristics with corrugated rolls that exhibit various wear detects. Here, graph 900 shows a comparison of an actual flute contour and graph 910 shows an ideal line for this corrugated roll. In a purely visual overview, such wear differences cannot be detected. The increased energy consumption leads to overheating of the grinding components and their surroundings, by which the moisture in the surrounding area and in the ground product is reduced. In this way, wear leads to reduced product quality and quantity. It is therefore decisive to find the correct time for a maintenance job or replacement of components, particularly the grinding rolls, to retain a high product quality and optimize the operating costs. In avoiding the negative effects due to wear, the process and system for monitoring wear on components of a grinding mill and the grinding mill with such a system is helpful in accordance with the present invention, in the following, the process is explained using the example of wear on smooth rolls and corrugated rolls. However, the process can also be used with other components of the grinding mill.

Illustrated in a simplified way, a surface temperature of a shell surface of at least one roll of the grinding mill and/or the temperature of a ground product are measured, and with at least two temperature sensors which measure the temperature of the at least one roll or a layer of product in various places. In a monitoring process in accordance with the invention, it is possible to detect and monitor the temperature where it is generated, in other words, on the surface of the rolls. Furthermore, to monitor the roll temperature, the temperature of a ground product is monitored directly, as the roll transfers heat to the ground product and by measuring the temperature of the ground product, a conclusion as to the temperature of the grinding rolls is possible.

Figure 5A:
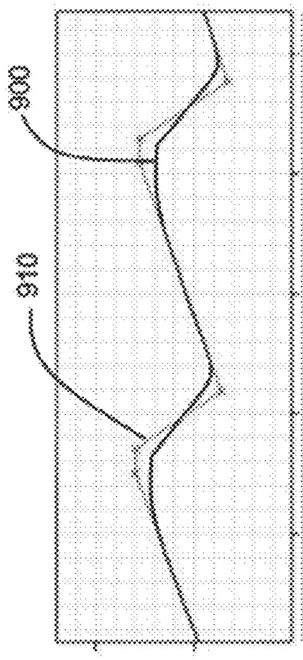
FIGS. 5*a*-5*d* show: Examples of wear in corrugated rolls.
Figure 5B:
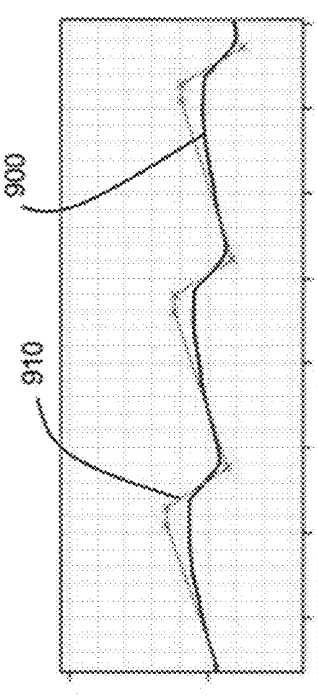
Figure 5C:
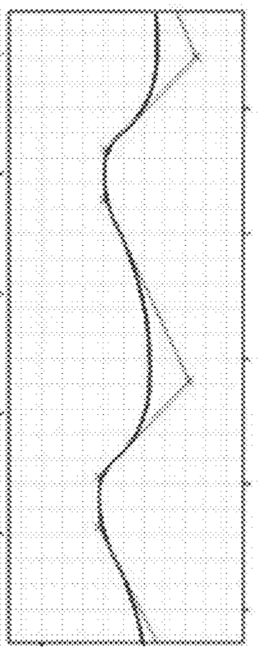
Figure 5D:
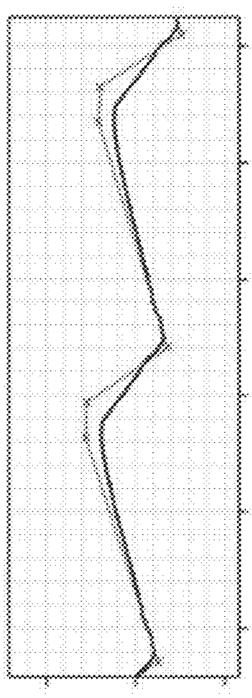

In on illustrative example of the process and system for monitoring wear on components of a grinding mill, a monitoring device for automated optimization of a control system of a grinding mill is constructed, as illustrated in potent application EP 3500370 B1 of the applicant. In this monitoring device, the control system of the grinding mill, particularly its grinding rolls, is optimized automatically by evaluation of measurement data on components of the grinding mill by means of a machine learning unit over the service life. However, the monitoring device does not determine any optimized maintenance time based on wear measurement data, operating measurement data, specification data and any additional information, as the present invention proposes. At least for the design of the grinding mil, the arrangement of measurement sensors on the grinding rolls, the description of wear on smooth rolls and on corrugated rolls and other characteristics in the context of operating grinding mils in the prevent invention are found in full in the description on this matter from patent application EP 3500370 B1. This description is hereby to be recorded in the description of the present invention. This particularly relates to the description of the following figures from EP 3500370 B1. In FIG. 2, the detection of a flute type of a corrugated roll is described by means of measurements on the roll, in which the surface structure of the roll is specified in both the x-axis and in the y-axis. In FIGS. 3 and 4, a grinding mill is described that exhibits a grinding roll with several temperature sensors and data transmitters. FIG. 5*a* and 5*b* show two possible illustrative examples of integration of sensors in one or both rolls of the roll pair of the grinding mill. In FIG. 5*a* as in 5*b*, the acceleration measurement is taken using an accelerometer. FIG. 6 shows an illustrative example of the arrangement of measurement sensors on a grinding mil. As measurement sensor, for example, a wear sensor, a pressure sensor, a temperature sensor, a vibration sensor, an acceleration sensor/accelerometer, a force sensor or a deformation sensor, etc. are used. FIG. 7 illustrates the arrangement of measurement sensors. FIGS. 8 and 9 explain the integration of measurement sensors.

Figure 6A:
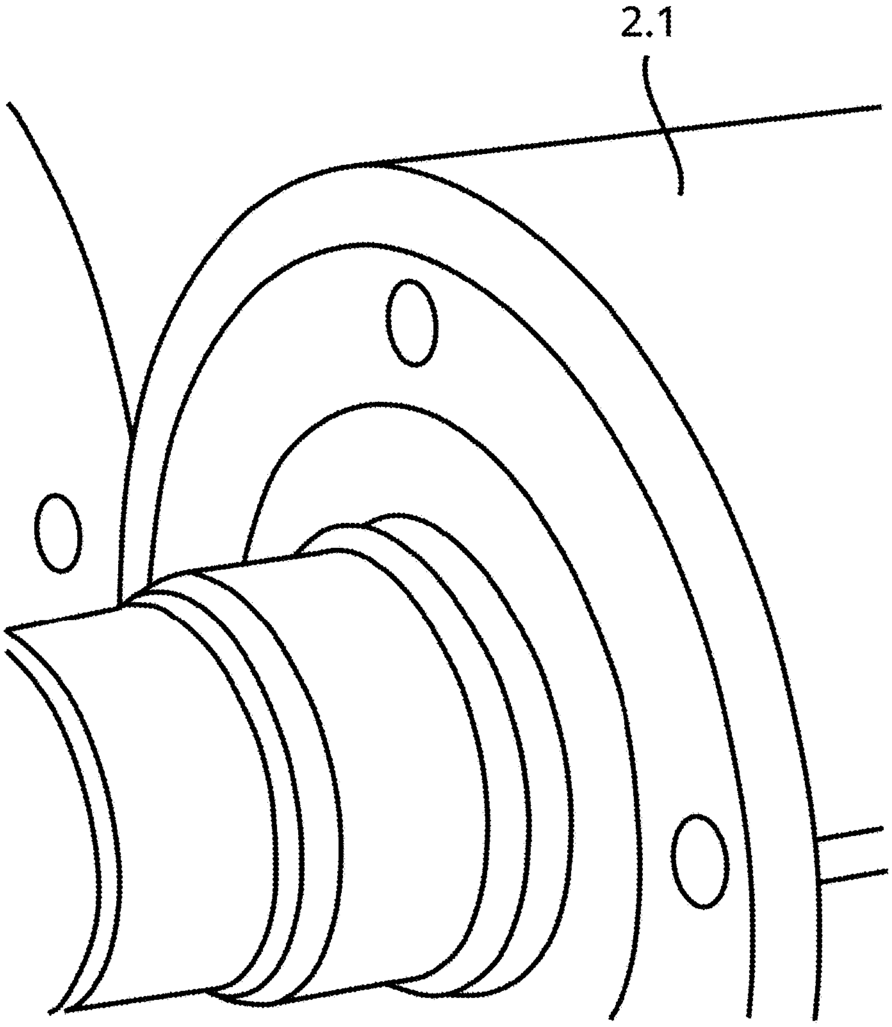
FIGS. 6*a* & 6*b* show: Wear analysis on surfaces of smooth rolls.
Figure 6B:
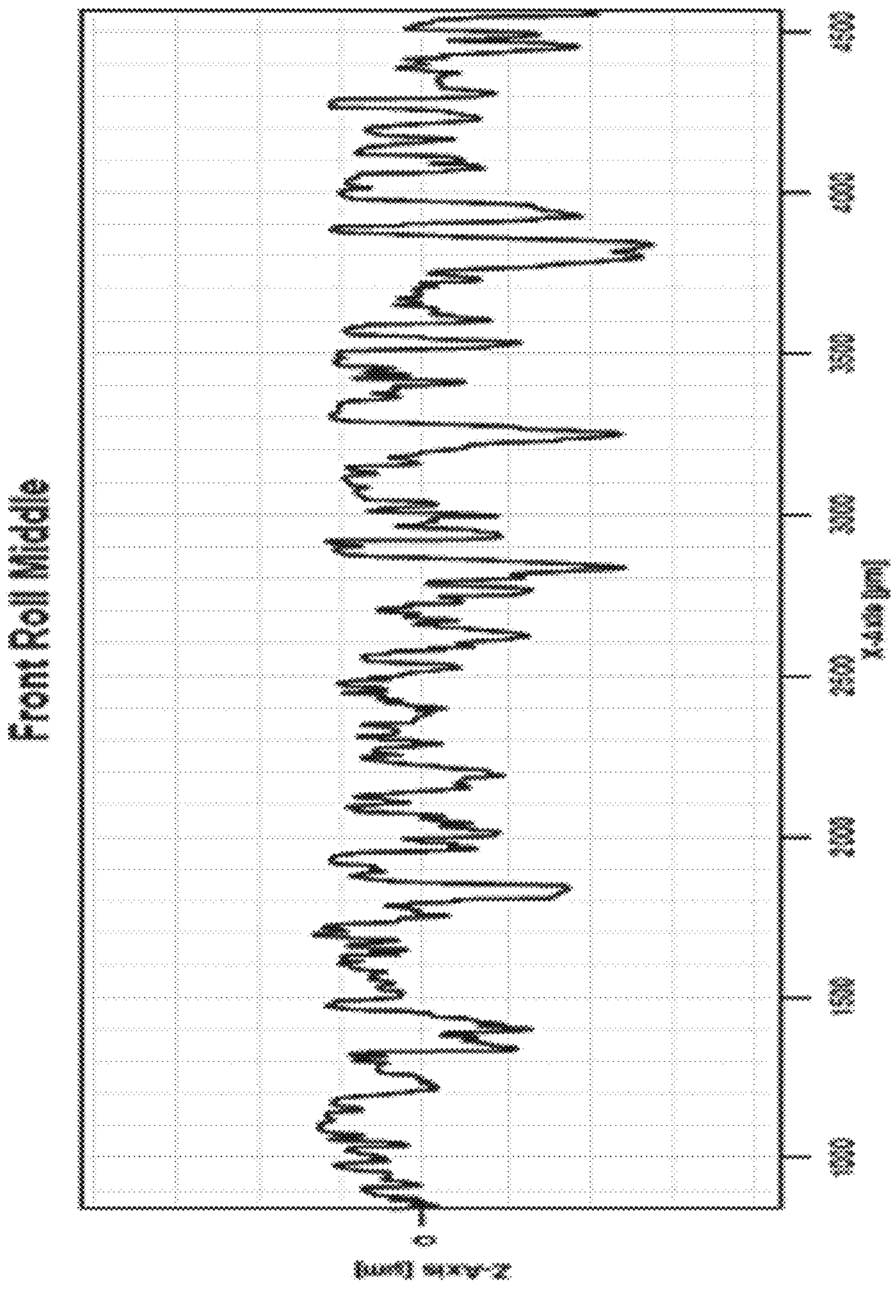

In a variant of the monitoring process in accordance with the present invention, the surface characteristics of smooth rolls 2.1, as it is shown in FIG. 6*a*, for example, are checked continuously or periodically. With the measurement data of the measurement sensors, the curve over time of the roughness of the surface can be monitored. FIG. 6*b* shows the surface roughness over the length of the roll. The characteristics of the surface, for example, con be detected by means of optical measurement sensors. Preferably, the roughness of the surface is ascertained with a gaging measurement sensor comprising a sensitive diamond tip that gages the surface. From the gaging measurement data, the analysis unit ascertains the surface profile and ascertains a wear state and/or degree of wear of the smooth roll therefrom. This is done, for example, by comparing with a theoretical or ideal reference surface profile, or by comparison of various measurements over time. Furthermore, the analysis unit assigns a maintenance loss to the degree of wear, inasmuch as with this degree of wear, maintenance would have been carried out. The maintenance loss may, for example, be ascertained from the actual measurement data on the quality and quantity of ground product at the time of the degree of wear considered. The maintenance loss may also be ascertained using a reference value for the grinding yield. From the curve of the degree of wear and/or the maintenance loss, the analysis unit ascertains a future degree of wear and assigns a future maintenance loss. Furthermore, the analysis unit ascertains the measurement of surface roughness of the actual grinding yield level over time from operating data of the grinding mil during this time period. From this, an actual grinding yield loss relative to a target yield level of the grinding mill is determined, from which a future grinding yield loss is derived in the future. By means of this ascertained forecast for the maintenance loss and the grinding yield loss, the analysis unit establishes an optimized maintenance time TW in the future, by which as a future maintenance time TW that time is established at which the future maintenance loss corresponds to the future grinding yield loss due to the wear of the surface of the smooth roll, as shown in FIGS. 4*a* and 4*b*.

FIG. 7 shows on example of a measurement report as can be displayed by the output unit for the measurement data from FIG. 6*b*. In the report, an operator obtains, as well as information on the measurement method, such as measurement location, measurement type and roll identification, other information on a mean roughness value according to standard DIN EN ISO 4287 and classification of the roughness, such as "OK". "watch" or "critical".

Figure 8A:
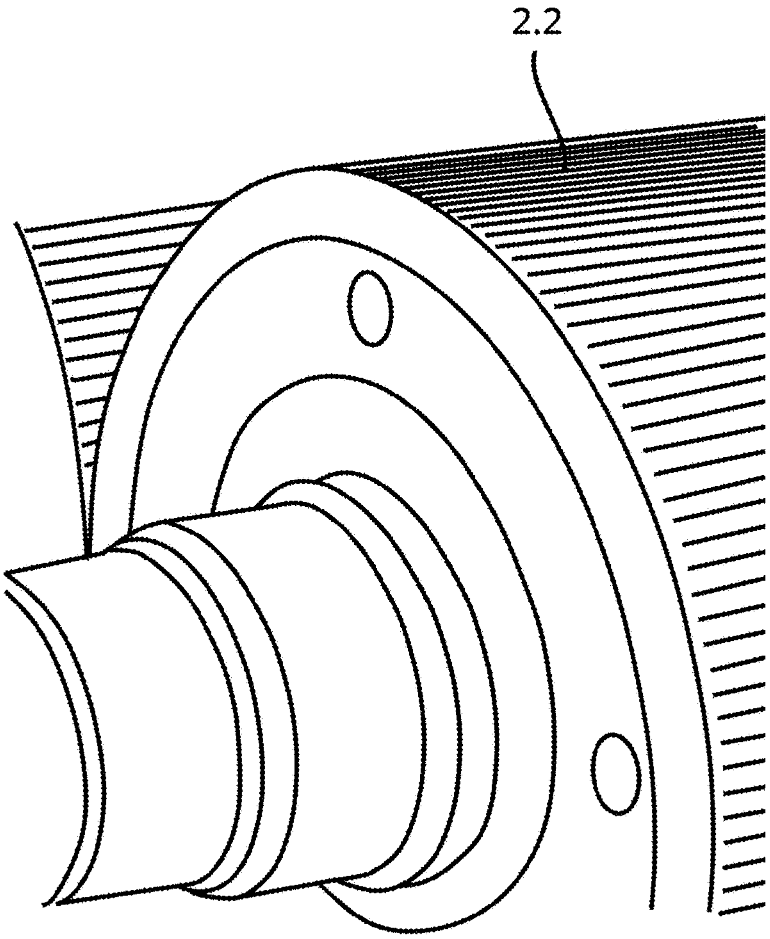
FIGS. 8*a* & 8*b* show: Wear analysis on surfaces of corrugated rolls.
Figure 8B:
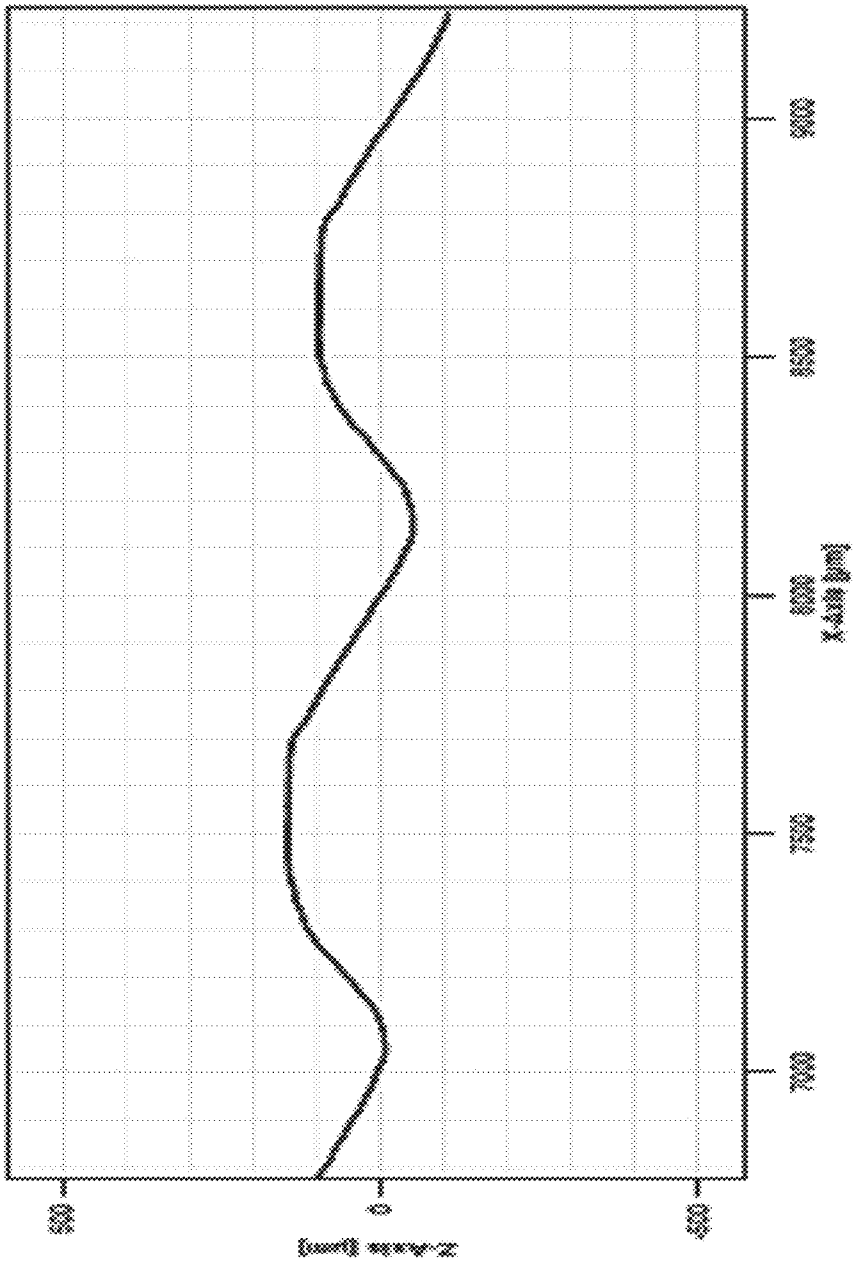

In a further variant of the monitoring process in accordance with the present invention, the surface characteristics of corrugated rolls 2.2, as it is shown in FIG. 8*a*, for example, are checked continuously or periodically. With the measurement data of the measurement sensors, the curve over time of the wear of the flute can be monitored. FIG. 8*b* shows a surface contour of the flute ascertained from the measurement data. In the monitoring process, the curve of wear of this contour is monitored over time and a wear curve for the future is generated therefrom. As in the preceding variant of a process for smooth rolls, the analysis unit ascertains from the measurement data on the surface contour a wear state of the corrugated roll and assigns a degree of wear and a maintenance loss to this. Furthermore, from several pieces of measurement data detected at different times, a future wear condition is derived and a relevant future degree of wear and future maintenance loss are assigned. At the some time, the analysis unit ascertains from the measurement data of the operating state of the grinding mill a grinding yield level that specifies the yield from operation of the grinding mill, and determines a grinding yield loss from this relative to a target yield level of this grinding mill. From several pieces of measurement data detected at different tines on the operating state, a future operating state and therefrom a future grinding yield loss in the future are derived. In accordance with the invention, the analysis unit establishes from this an optimized maintenance time in the future, by determining as the future maintenance time that time at which the future maintenance loss due to wear of the corrugated roll corresponds to the future grinding yield loss.

FIG. 9*a* shows an example of a measurement report as con be displayed by the output unit for the corrugated roll from FIG. 8*b*. In the report, graph 900 shows the measured flute contour in a defined measurement range. Furthermore, the operator obtains information on the actual values of the flute contour, on target values and on usual tolerance values. Furthermore, a categorization of a wear condition of flute edges, the entire roll and the roll stump can be specified, such as "sharp", "dull" and "critical". Furthermore, the flute characteristic angles can be specified, such as further described 3*s* below. FIG. 9*b* shows an analysis report, as is available for the corrugated roll from FIG. 8*b*. In this, in turn, the graph of the flute contour 900 is shown illustrated according to the measurement data, as in FIG. 9*a*. Furthermore, a theoretical ideal line 910 for the flute contour is depicted as a comparison. Furthermore, the additional key data of the actual flute contour are specified, such as wear ratio, a wear height, a reduction of height, a gap width to a parallel corrugated roll, a value for the parallelity of the rolls, etc. Finally, a classified recommendation is given, such as "Corrugation still intact", "Corrugation at the end of service life" or "Corrugation is to be replaced". Further analysis results are explained in the context of FIG. 13. FIG. 9*c* shows, as an example, a forecast report on this corrugated roll. The forecast report specifies the analysis graph, as explained in FIG. 4*a*, for the wear on this corrugated roll. Furthermore, the forecast report specifies values for the yield loss, the loss due to increased energy consumption, actual maintenance costs, a degree of wear, an anticipated lifetime and a time until the next recommended maintenance of the corrugated roll. In this example, the operating lifetime is still 15.25 months. Maintenance of the roll is recommended in 11 months.

Figure 10A:
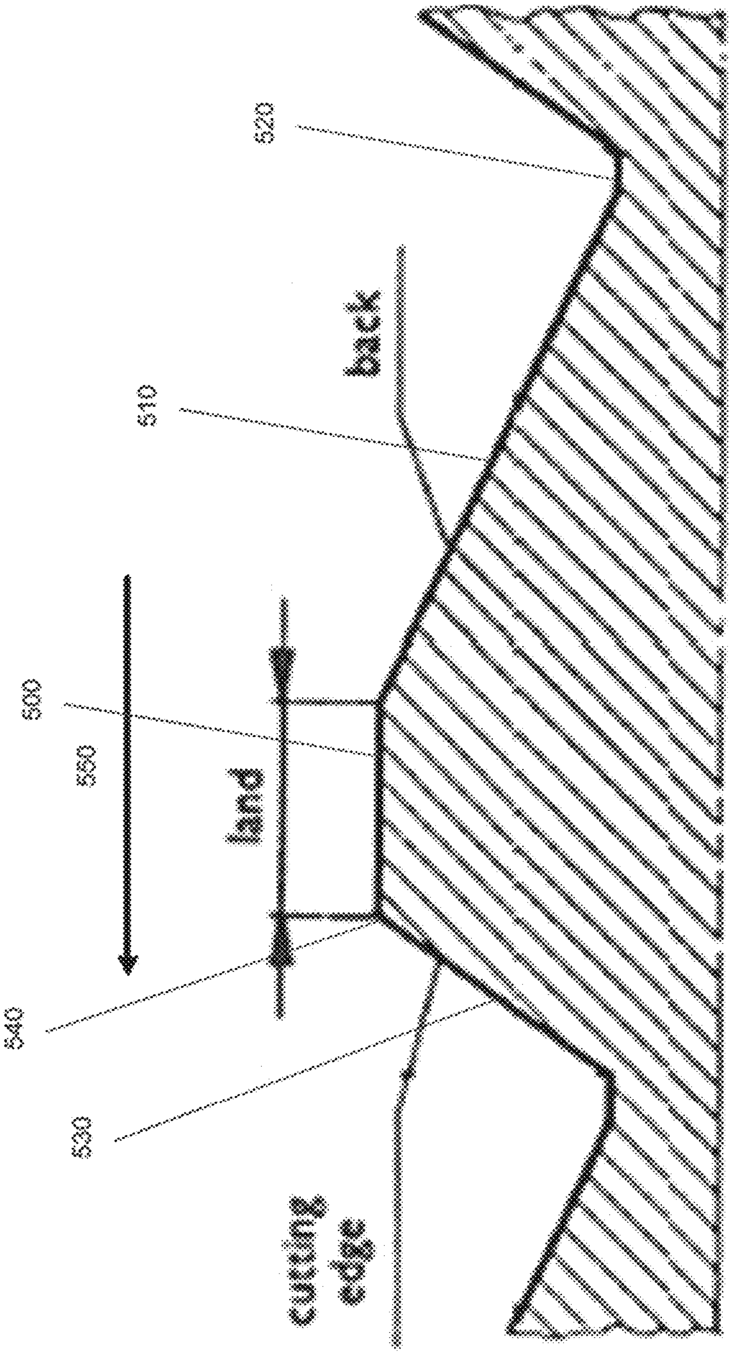
FIGS. 10*a* & 10*b* show: a schematic illustration of a fluting technology in corrugated rolls.
Figure 10B:
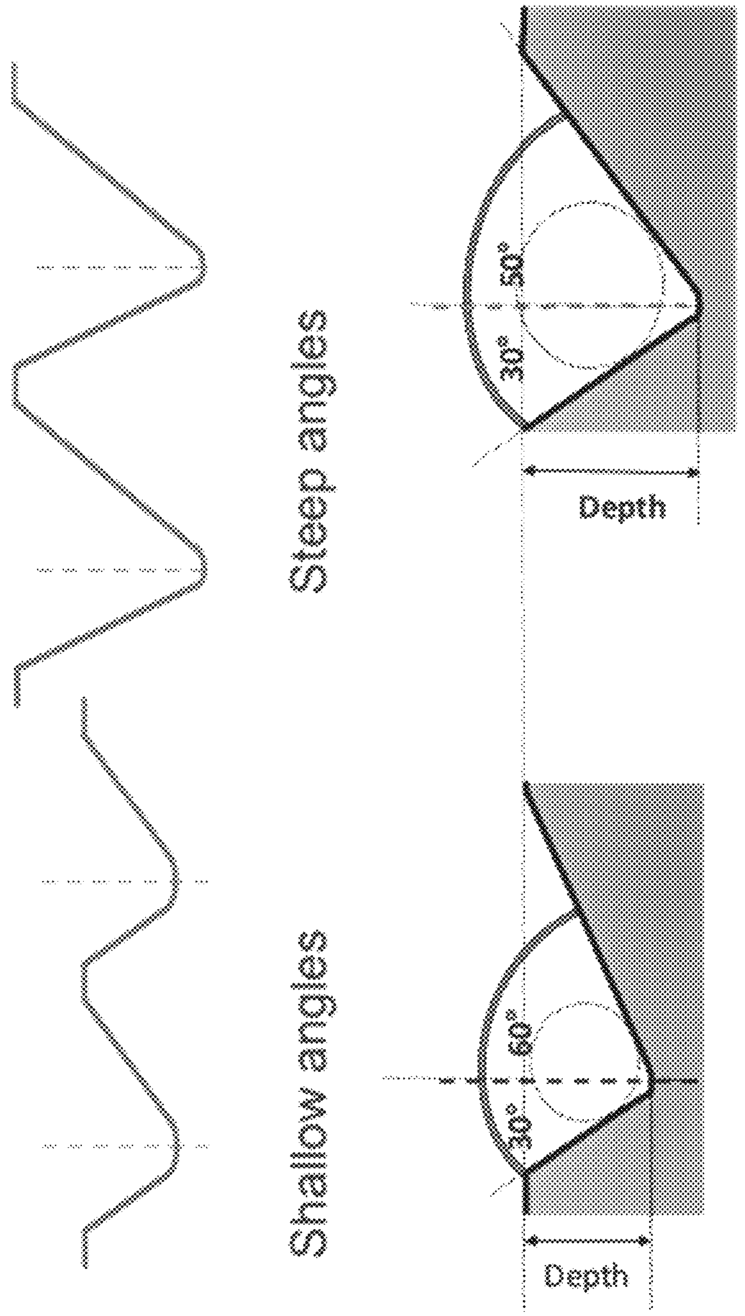
Figure 11:
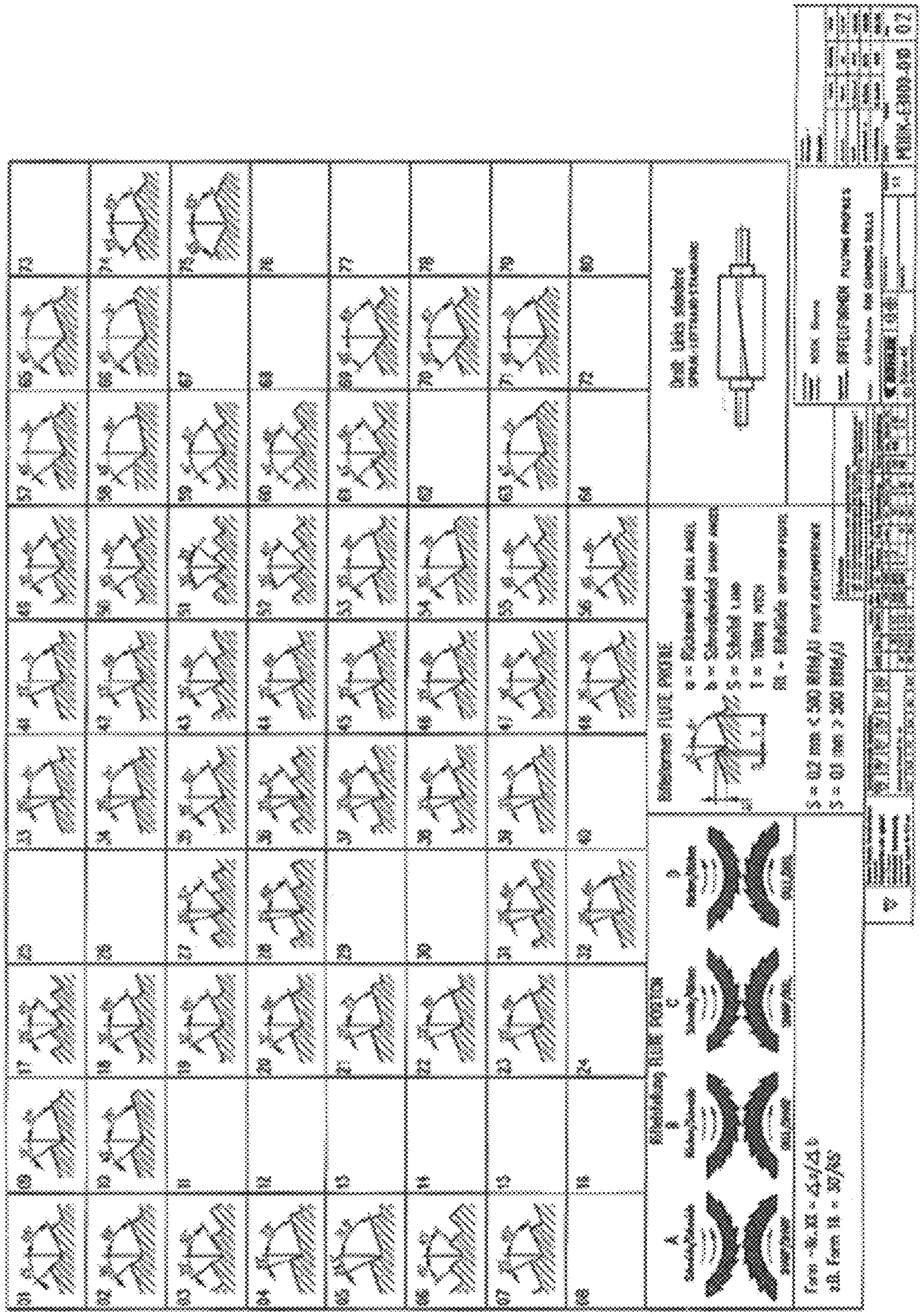
FIG. 11 shows: a tabular overview of flute types for corrugated rolls

In FIGS. 10*a* and 10*b*, examples of flute contours are shown, to explain the characteristics for corrugated rolls. The flutes of a corrugated roll are described using FIG. 10*a*. Flutes of corrugated rolls exhibit the following surfaces: a crushing surface 500, also described as land, a free surface or back 510, leading behind a flute into a base surface 520, and a cutting surface 530 forming a cutting edge 540 with the land 500. The preferred direction of rotation when using the corrugated roll is shown sketched with an arrow 550. Flat flute contours (left in FIG. 10*b*) are used for small grinding material and deep flute contours (right in FIG. 10*b*) for coarser grinding material. Therefore, the height and/or the depth of the flute extends from the base surface 520 to the land 500. FIG. 11 shows in tabular form various illustrative examples of flute contours, as are currently in use in corrugated rolls. In this case, the various illustrative examples differ primarily by the angle that the cutting surface and the back have to a normal of the roll surface. Various illustrative examples of corrugated rolls are used for various grinding materials and for different quality requirements. A grinding mill is correspondingly equipped with suitable corrugated rolls when it is being used.

Figure 12:
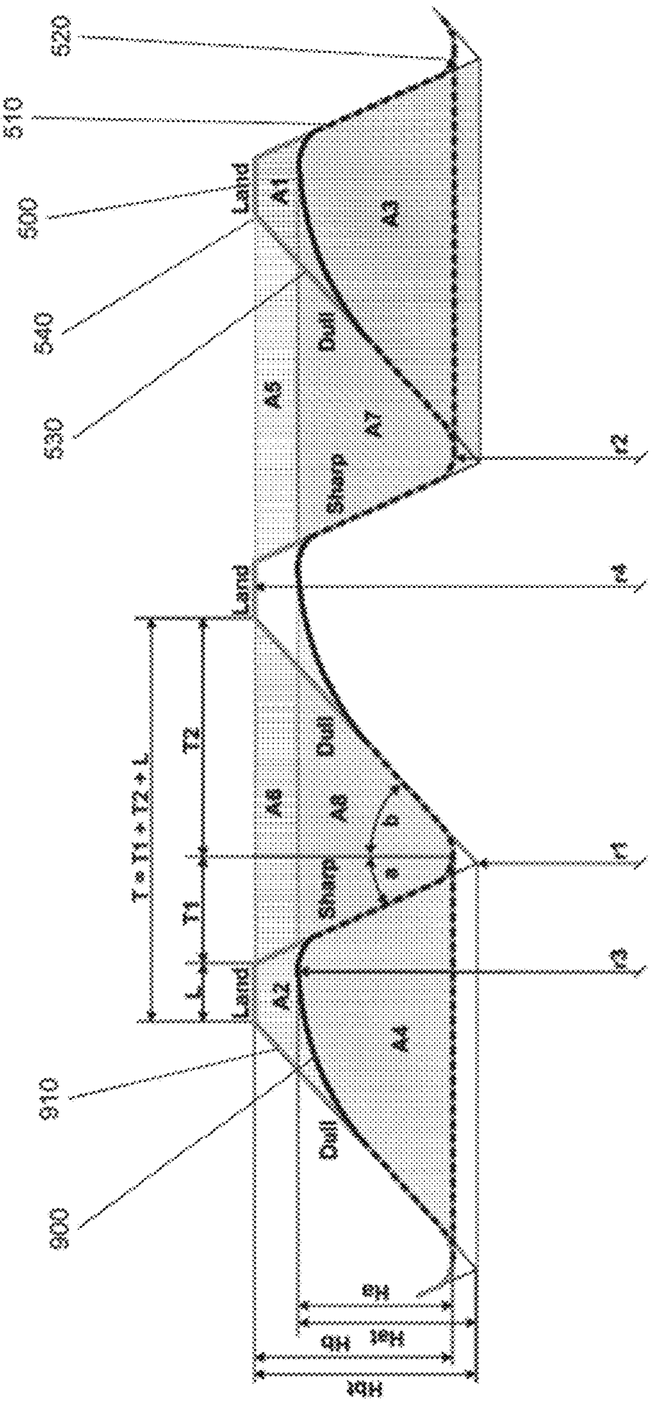
FIG. 12 shows: a schematic illustration of parameter values for corrugated rolls with wear.

FIG. 12 shows a schematic illustration of the characteristics of a corrugated roll with wear. In this case, graph 900 shows again the actually-measured surface contour and graph 910 the ideal line as explained in FIGS. 10*a* and 10*b*. Furthermore, mutually distances from adjacent flutes are defined: T1 corresponds to a distance from the baseline up to one of the edges of the land 500 opposite the cutting edge 540, T2 corresponds to a distance from the baseline to the cutting edge 540, L corresponds to the length of the land and T corresponds to a distance from a cutting edge 540 to the next cutting edge of an adjacent flute. Furthermore, the flutes with characteristic heights are described: Hb corresponds to height from the baseline to the land and Ha a height from the baseline to the highest point of the measured land. In addition, various rounding radii of the wear describe a contour shape: r2 describes a radius from the baseline and r3 a radius from the land. An angle a specifies the angle between a back and the normals and an angle b specifies the angle between a cutting surface and the normals. The angles a and b are used to designate the types of flute, as listed in FIG. 11. All the characteristics mentioned can be detected using the sensory system of the monitoring system in accordance with the invention and be used to determine the degree of wear of the corrugated roll, as described above.

To determine the energy-saving potential, a mathematical model is used by the analysis unit, for example, for various types of wheat, that has been worked out on the basis of real experiments with statistical test planning on a laboratory roll stand. In the model, the wear of the rolls as a percentage in relation to the cross-sectional surface of the flute is used as variable A, the mass flow in kilograms per second as variable B and the ejection on a 1120 micrometer screen as a percentage is used as variable C. From the tests, a model for calculating the specific grinding energy according to the following formula has been produced:

$$\text{Specific grinding energy}=1.845+0.057A+10.00185B-0.05C-0.00042AB-8.000184A^2$$

In this way, the energy saving potential can be determined from the comparison between any worn flute and a new flute.

Figure 13:
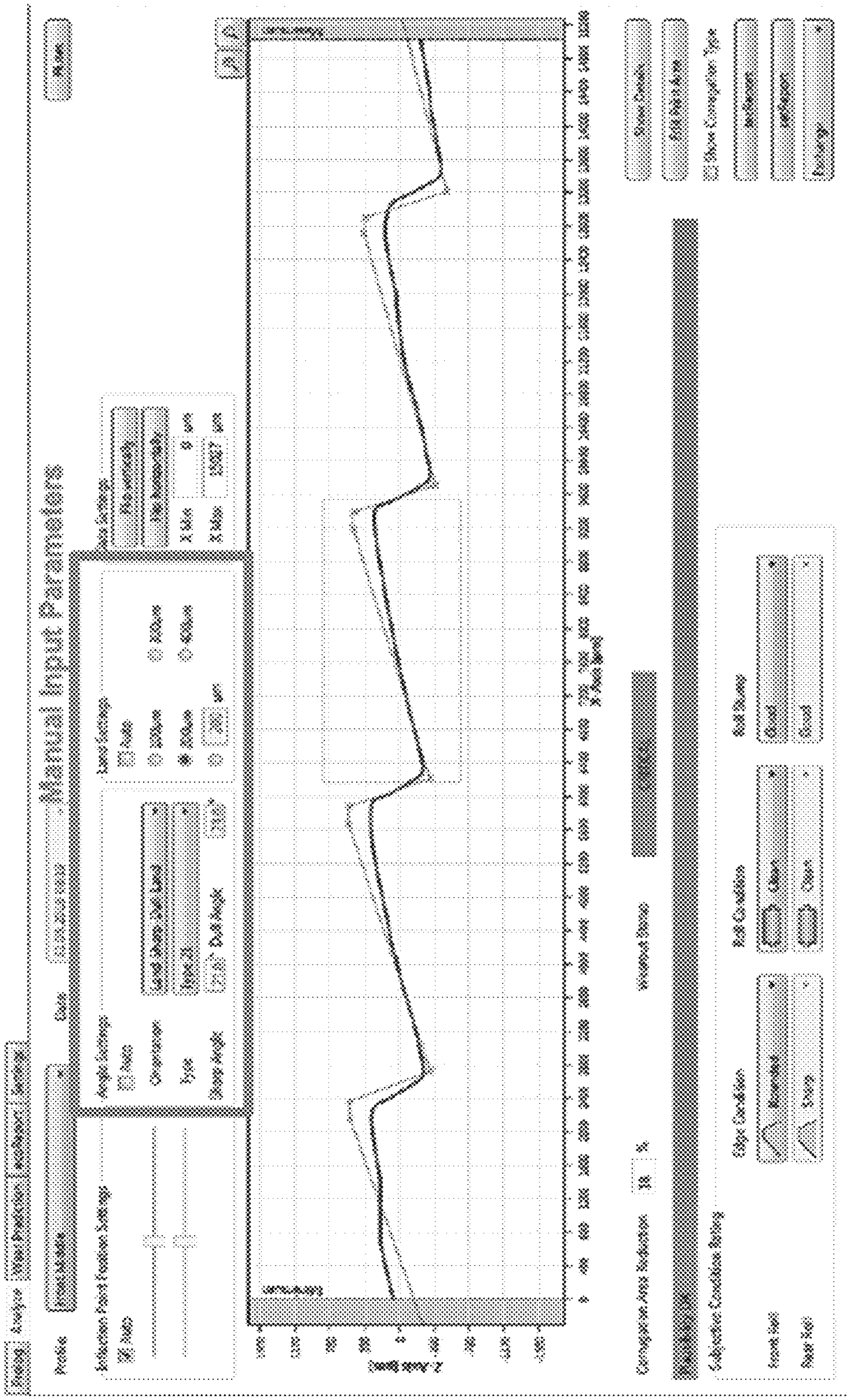
FIG. 13 shows: an interaction field for inputting specification data.

FIG. 13 then shows an analysis report on a corrugated roll that has been compiled according to the monitoring process in accordance with the invention. In this form of report, certain key values of the corrugated roll are manually input, such as the orientation of the flute, a type specification and measurement information for the land of the flute type. The orientation is used by the analysis unit to insert the measured flute contour into the ideal contour. The type specification can, for example, be used to determine the reference angle or target angles of the flute contour. The measurement information for the land can also be used as a reference value. The reference values can also be utilized to determine thresholds for analysis by the analysis unit. The monitoring process then ascertains, on the basis of this information, the measured data, the operating data and possibly from the specification data, the degree of wear, the maintenance loss, the grinding yield loss and an optimized future maintenance time, as depicted above. For example, specification data on various types of wheat are used. In the analysis report, the analysis results, for example, by wear as a percentage of the target level, by ratios of the measurement and target level or by classifications, as specified in the depiction above.

Figure 14:
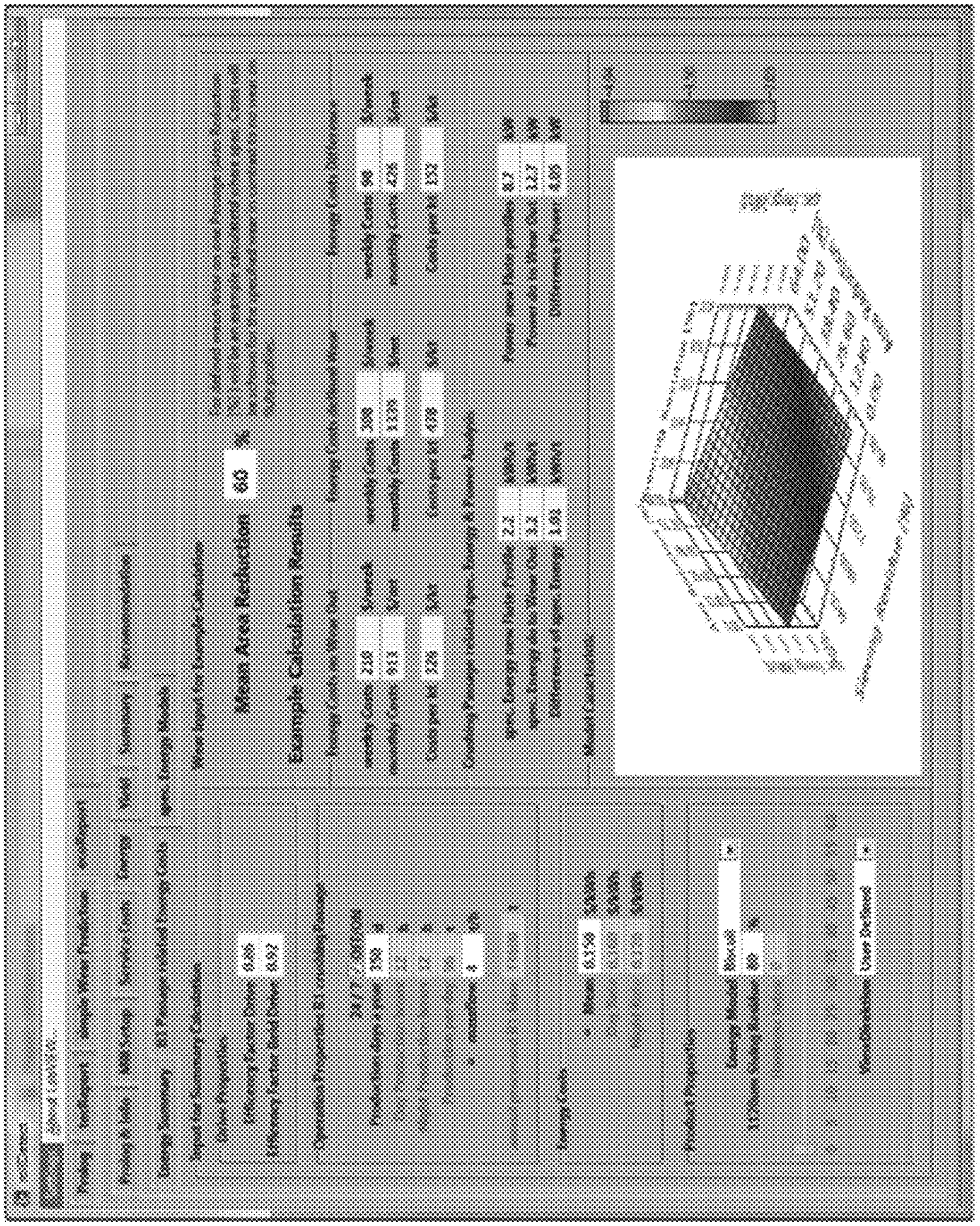
FIG. 14 shows: a graphical example of an analysis model for determining a future maintenance time.

FIG. 14 shows an example of a forecast report on the corrugated roll described in the analysis report from FIG. 13. The forecast relates, in this case, to the energy saving potential, as described above, and is illustrated using a three-dimensional graph that illustrates the variables from the formula for the specific grinding energy graphically. Furthermore, the forecast report specifies the energy costs with and without wear of the corrugated rolls. This costing can then be utilized to determine the optimum future maintenance time according to the monitoring process of the invention.

In a grinding mill equipped with a monitoring system in accordance with the present invention, unnecessary downtimes are prevented on the basis of maintenance work or material failure, the productivity and the service life can be improved and the costs for operation of the mill can be planned transparently and optimized.

List of Reference Numbers

| | |
|---|---|
| 1 | Grinding mill |
| 2, 2.1, 2.2 | Grinding roll |
| 3 | Control unit |
| 4 | Sensory system |
| 4.1-4.8 | Measurement sensors |
| 5 | Identification means |
| 6 | Analysis unit |
| 7 | Cloud platform |
| 8 | Data transmitter |
| 9 | Data receiver |
| 10 | Data pool |
| 11 | Machine learning module |
| 12 | Output unit |
| 13 | Servicing module |
| 14 | Statistical module |
| 15 | |
| 16 | Computational device |
| 17 | Feed roll |
| 18 | Feed roll |
| 19 | Data transmission |
| 40 | Wear data |
| 50 | Operating measurement data |
| 60 | Specification data |
| 100 | Grinding material |
| 110 | Ground product |
| 200 | Data detection |
| 210 | Collection of specification data |
| 220 | Analysis step |
| 230 | Maintenance step |
| 240 | Updating step |
| 250 | Concluding step |
| 300 | Maintenance loss |
| 310 | Future maintenance loss |
| 320 | Yield loss |
| 410 | Grinding mill loss curve |
| 420 | Maintenance loss curve |
| 430 | Preventive maintenance period |
| 440 | Forecast maintenance period |
| 450 | Maintenance period in case of failure |
| 500 | Land |
| 510 | Back |
| 520 | Base surface |
| 530 | Cutting surface |
| 540 | Cutting edge |
| 550 | Direction of rotation |
| 900 | Corrugated roll contour |
| 910 | Ideal line for corrugated roll |
| TA | Actual time |
| TW | Future time |

The invention claimed is:

1. A process, comprising:

detecting measurement data on a wear condition of a component of a grinding mill and on an operating state of the grinding mill periodically or continuously over time;

assigning the measurement data to at least one parameter on the wear condition of the component of a degree of wear of the component and the degree of wear to a maintenance loss, corresponding to a yield loss based on technical maintenance of the component;

deriving from several pieces of measurement data detected at different times a future wear condition at a time in the future;

assigning the future wear condition to a future degree of wear and a future maintenance loss;

assigning the measurement data on at least one parameter of the operating state of the grinding mill a grinding yield value that specifies a yield from operation of the grinding mill;

determining a grinding yield loss relative to a target yield level of the grinding mill;

deriving a future operating state from several pieces of measurement data detected at different times;

deriving a future grinding yield loss at a future time;

optimizing a maintenance time in the future, by establishing as the future maintenance time that time at which the future maintenance loss corresponds to the future grinding yield loss; and controlling an operation of the grinding mill based on the future maintenance time.

2. The process in accordance with claim 1, further comprising:

aggregating the measurement data of the at least one parameter on the wear condition of the component and/or on the operating state of the grinding mill; and assigning, based on the measurement data which has been aggregated, an aggregated degree of wear to the component and a relevant maintenance loss and/or assigning the operating state of the grinding mill an aggregated grinding yield loss.

3. The process in accordance with claim 1, further comprising:

compiling a forecast of the future maintenance loss and the future grinding yield loss using regression and/or interpolation.

4. The process in accordance with claim 1, further comprising:

optimizing the future maintenance loss and the future grinding yield loss automatically using machine learning.

5. The process in accordance with claim 4, wherein:

the machine learning sends a control signal for regulation of the operation of the grinding mill, the operation of the grinding mill is optimized corresponding to a desired maintenance time, self-adaptively in such a way that the future maintenance time corresponds to the optimized maintenance time.

6. The process in accordance with claim 4, wherein the optimizing further comprises:

optimizing the operation of the grinding mill by an optimization in relation to an amount of parallelism of grinding rolls of a roll pair, a mutual gap of the grinding rolls and/or a rotational velocity of the grinding rolls, based on the future maintenance loss and the future grinding yield loss.

7. The process in accordance with claim 1, wherein the detecting the measurement data comprises: detecting measurement data on a temperature of components, a roll profile and/or a roughness of grinding rolls of the grinding mill, a rotational velocity of the grinding rolls, a vibration of the grinding rolls, a gap of rolls of a grinding roll pair, energy consumption of the grinding mill, production quantity of the grinding mill, a grinding level of a material being ground, a time since last maintenance and/or downtimes of the grinding mill.

8. The process in accordance with claim 1, further comprising:

optimizing the maintenance time in the future using specification data from the grinding mill and/or a grinding material to be ground from a data pool to determine the future maintenance loss and the future grinding yield loss.

9. The process in accordance with claim 8, wherein:

the data pool provides data relevant to a specific grinding mill, particularly data on costs for material and work for a maintenance task, energy costs for operation of the grinding mill and/or information on the grinding material.

10. The process in accordance with claim 8, wherein:

the data pool provides measurement data on technical parameters relating to a wear condition of a component and/or an operating state of other, comparable grinding mills, for optimization of determining the future maintenance loss and future grinding yield loss by comparison and/or inclusion of the measurement data.

11. The process in accordance with claim 1, further comprising:

visually displaying a degree of wear of at least one component and/or a maintenance loss relating to at least one component and/or a grinding yield loss of the grinding mill as a curve over time.

12. The process in accordance with claim 11, wherein:

visually displaying includes displaying a visualized, tailored dashboard format, designed in such a way that wear reports, recommended future maintenance times and information on a grinding operation are displayed.

13. The process in accordance with claim 1, further comprising:

loading the measurement data on technical parameters in relation to a wear condition of a component and the operating state of the grinding mill into a cloud platform and/or a data pool with data relating to a specific grinding mill and/or data relating to other, comparable grinding mills into the cloud platform.

14. The process in accordance with claim 1, further comprising:

automatically triggering a cycle of maintenance for the grinding mill based on the future maintenance loss ascertained and the future grinding yield loss by an automated signal generation and transmission and/or an offer for maintenance of the component and/or a maintenance order.

15. The process in accordance with claim 1, further comprising:

uniquely identifying a grinding roll of the grinding mill using electronically stored data relating to the component.

16. The process in accordance with claim 1, further comprising:

transferring at least an actual degree of wear and an actual grinding yield level for automated control of the grinding mill.

17. The process in accordance with claim 1, further comprising:

ascertaining from measurement data on technical parameters relating to a wear condition of a component and/or from measurement data on the operating state of the grinding mill at least one specific maintenance task required for specific wear and establishing a future maintenance time for this required specific maintenance task as a time at which a specific future maintenance loss resulting from the specific wear corresponds to a specific future grinding yield loss resulting from the specific wear.

18. The process according to claim 1, further comprising:

performing maintenance based on the maintenance time which has been optimized.

19. A system, comprising:

sensors for detecting measurement data on a wear condition of a component and an operating state of a grinding mill;

analysis circuitry configured to:

assign the measurement data to at least one parameter on the wear condition of the component of a degree of wear of the component and the degree of wear to a maintenance loss, corresponding to a yield loss based on technical maintenance of the component, derive from several pieces of the measurement data, a wear condition at a future time and to assign to it a future degree of wear and a future maintenance loss, assign the measurement data on at least one parameter of the operating state of the grinding mill a grinding yield value that specifies a yield from operation of the grinding mill, determine a grinding yield loss relative to a target yield level of the grinding mill, derive a future operating state from several pieces of measurement data detected at different times, derive a future grinding yield loss at a time in the future therefrom, optimize a maintenance time in the future, by establishing as the future maintenance time a time at which the future maintenance loss corresponds to the future grinding yield loss, and control an operation of the grinding mill based on the future maintenance time.

20. The system in accordance with claim 19, wherein:

the sensors include at least one of a temperature sensor and a vibration sensor, and the sensors further include a data transmitter and a microprocessor to provide the measurement data on a grinding roll of the grinding mill for the analysis circuitry.

21. The system in accordance with claim 19, wherein:

the analysis circuitry receives data regarding a specific grinding mill from a digital cloud platform.

22. The system in accordance with claim 19, wherein:

a grinding roll of the grinding mill includes an identifier for unique identification.

23. The system in accordance with claim 19, wherein the analysis circuitry includes:

circuitry for machine learning;

servicing circuitry; and aggregation circuitry and/or regression circuitry, that is present in a cloud platform.

24. A grinding mill for grinding of grinding material, comprising:

a grinding roll pair; and the system in accordance with claim 19.

25. The grinding mill in accordance with claim 24, wherein:

the grinding roll pair is configured for grinding wheat and/or rye and/or durum wheat and/or oats and/or barley and/or peas and/or chick peas and/or pulses and/or rape and/or soya and/or cacao and/or coffee as a grinding material.

* * * * *